US007219660B2

(12) United States Patent
Amano et al.

(10) Patent No.: US 7,219,660 B2

(45) Date of Patent: *May 22, 2007

(54) FUEL VAPOR TREATMENT SYSTEM FOR INTERNAL COMBUSTION ENGINE

(75) Inventors: Noriyasu Amano, Gamagori (JP); Takanobu Kawano, Okazaki (JP); Koichi Inagaki, Aichi-gun (JP); Nobuhiko Koyama, Nagoya (JP); Masao Kano, Gamagori (JP); Shinsuke Takakura, Kariya (JP); Yoshichika Yamada, Kuwana-gun (JP)

(73) Assignees: Denso Corporation, Kariya, Aichi-pref. (JP); Nippon Soken, Inc., Nishio, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/259,108

(22) Filed: Oct. 27, 2005

(65) Prior Publication Data

US 2006/0042605 A1 Mar. 2, 2006

Related U.S. Application Data

(62) Division of application No. 11/087,811, filed on Mar. 24, 2005, now Pat. No. 6,971,375.

(30) Foreign Application Priority Data

Mar. 25, 2004 (JP) .............................. 2004-89033
Nov. 10, 2004 (JP) .............................. 2004-326562
Dec. 27, 2004 (JP) .............................. 2004-377452

(51) Int. Cl.
*F02M 33/02* (2006.01)
*G01L 3/26* (2006.01)

(52) U.S. Cl. ................. 123/520; 123/198 D; 73/119 A

(58) Field of Classification Search ............ 123/198 D, 123/494, 516, 518, 519, 520, 521; 73/119 A, 73/23.32
See application file for complete search history.

(56) References Cited

U.S. PATENT DOCUMENTS

| | | | | |
|---|---|---|---|---|
| 5,178,117 | A | 1/1993 | Fujimoto et al. | |
| 5,216,995 | A | 6/1993 | Hosoda et al. | |
| 5,390,645 | A | 2/1995 | Cook et al. | |
| 5,447,141 | A | 9/1995 | Kitamoto et al. | |
| 6,016,792 | A | 1/2000 | Kawano et al. | |
| 6,722,348 | B2 * | 4/2004 | Nagasaki et al. | 123/520 |

(Continued)

FOREIGN PATENT DOCUMENTS

| | | |
|---|---|---|
| JP | 05018326 | 7/1991 |

*Primary Examiner*—John T. Kwon
(74) *Attorney, Agent, or Firm*—Nixon & Vanderhye P.C.

(57) ABSTRACT

A pump generates a gas flow within a measurement passage having an orifice. A differential pressure sensor detects a pressure difference between both ends of the orifice. Switching valves are disposed in the measurement passage to create a first concentration measurement state in which the measurement passage is opened at both ends thereof and the gas flowing through the measurement passage is the atmosphere, and a second concentration measurement state in which the measurement passage is in communication at both ends thereof with a canister and the gas flowing through the measurement passage is a fuel vapor-containing air-fuel mixture provided from the canister. An ECU calculates a fuel vapor concentration by based on a pressure difference detected in the first concentration measurement state and a pressure difference detected in the second concentration measurement state.

30 Claims, 32 Drawing Sheets

U.S. PATENT DOCUMENTS

| | | | | |
|---|---|---|---|---|
| 6,817,232 | B2 * | 11/2004 | Amano et al. | 73/118.1 |
| 6,971,375 | B2 * | 12/2005 | Amano et al. | 123/520 |
| 2001/0049958 | A1 | 12/2001 | Yamaguchi et al. | |
| 2001/0054415 | A1 | 12/2001 | Hanai et al. | |
| 2003/0051541 | A1 * | 3/2003 | Kano et al. | 73/118.1 |
| 2003/0226549 | A1 * | 12/2003 | Takagi et al. | 123/520 |
| 2004/0089062 | A1 | 5/2004 | Matsubara et al. | |
| 2004/0094133 | A1 * | 5/2004 | Lingenhult et al. | 123/519 |

* cited by examiner

FUEL VAPOR TREATMENT SYSTEM FOR INTERNAL COMBUSTION ENGINE

RELATED APPLICATION

This is a division of our application ser. No. 11/087,811 filed Mar. 24, 2005, now U.S. Pat. No. 6,971,375.

CROSS-REFERENCE TO RELATED APPLICATION

This application is based on Japanese Patent Applications No. 2004-89033 filed on Mar. 25, 2004, No. 2004-326562 filed on Nov. 10, 2004, and No. 2004-377452 filed on Dec. 27, 2004, the disclosures of which are incorporated herein by reference.

FIELD OF THE INVENTION

The present invention relates to a fuel vapor treatment system for an internal combustion engine.

BACKGROUND OF THE INVENTION

The fuel vapor treatment system restricts the dissipation of fuel vapor produced in a fuel tank to the atmosphere. A fuel vapor introduced into the system from the fuel tank through an inlet passage is once adsorbed into an adsorbing material disposed within a canister and, when an internal combustion engine operates, the adsorbed fuel vapor is purged to an intake pipe in the internal combustion engine through a purging passage by utilizing a negative pressure developed within the intake pipe. The adsorption capacity of the adsorbing material is recovered by purging of the fuel vapor. Purging of the fuel vapor is performed by metering the flow rate of purged gas (the flow rate of purged air and that of purged fuel vapor) which metering is performed by a purge control valve disposed in the purging passage.

The purged fuel vapor burns together with fuel which is fed from an injector, therefore, in order to attain an appropriate air/fuel ratio, it is important to measure an actual amount of purged fuel vapor with a high accuracy. As a method for measuring the purge quantity, a method wherein a hot wire type mass flow meter is installed in a purging passage is disclosed in JP-5-18326A.

However, the flow meter is generally designed and calibrated on the premise of 100% air gas or a gas of a single component. Therefore, it has been difficult to measure with a high accuracy the flow rate of an air-fuel vapor mixture of which concentration is not constant like the purged gas. In JP-5-33733A (U.S. Pat. No. 5,216,995), another hot wire type mass flow meter is installed in an atmosphere passage which branches from the purging passage and the volume flow rate of the purged gas and the concentration of fuel vapor in the purged gas are detected from output values provided from the two mass flow meters.

In JP-5-18326A and JP-5-33733A (U.S. Pat. No. 5,216,995), since the flow meter(s) is installed in the purging passage, the concentration of fuel vapor cannot be detected unless purging of fuel vapor is performed with flow of purged gas. Therefore, for reflecting a measured concentration of fuel vapor in the control of air-fuel ratio, it is necessary to measure the concentration of fuel vapor before the purged fuel vapor reaches the injector position, and to correct a command value for the amount of fuel to be injected from the injector based on the measured concentration of fuel vapor.

However, in the case of an engine having a small intake pipe volume or in an operation region of a high flow velocity of intake air, the time required for purged fuel vapor to reach the injection position is shorter than the time required for completing the measurement of a fuel vapor concentration and thus it is hard to reflect a properly measured fuel vapor concentration in the control of air-fuel ratio. Alternatively, the engine structure including the layout of pipes, and the purge starting operation region are restricted. At present, throttling the purge flow rate up to the extent that the fuel vapor does not exert a bad influence on the control of air-fuel ratio is the only way to avoid the influence of variation in the concentration of fuel vapor. Without purge restriction, it is difficult to control the air-fuel ratio properly. Particularly, when a fuel vapor treatment system is to be applied to a hybrid vehicle which has recently been spotlighted, it is absolutely necessary to carry out a large quantity purge for the recovery of adsorption capacity because of the opportunity of purging is limited. It is expected to develop a technique which can measure an actual purge quantity of fuel vapor with a high accuracy and increase the purge flow rate.

SUMMARY OF THE INVENTION

The present invention has been accomplished in view of the above-mentioned problems and it is an object of the invention to provide a fuel vapor treatment system for an internal combustion engine which can measure the concentration of fuel vapor promptly and accurately and which thereby can purge fuel vapor efficiently and control the air-fuel ratio properly.

According to the present invention, a fuel vapor treatment system for an internal combustion engine includes a canister containing an adsorbing material for temporarily adsorbing fuel vapor conducted thereto from the interior of a fuel tank through an inlet passage; a purging passage for conducting an air-fuel mixture containing fuel vapor desorbed from the adsorbing material into an intake pipe of the internal combustion engine and purging the fuel vapor; and a purge control valve disposed in the purging passage to adjust the purge flow rate based on the result of measurement of a fuel vapor concentration in the air-fuel mixture.

The system further includes a measurement passage having an orifice; gas flow producing means for producing a gas flow within and along the measurement passage; measurement passage switching means for switching the measurement passage between a first concentration measurement state in which the measurement passage is opened to the atmosphere at both ends thereof, allowing air to flow as gas through the measurement passage and a second concentration measurement state in which the measurement passage is brought in communication at both ends thereof with the canister, allowing the air-fuel mixture fed from the canister to flow as gas through the measurement passage.

The system further includes a differential pressure detecting means for detecting a pressure difference at both ends of the orifice; and fuel vapor concentration calculating means for calculating a fuel vapor concentration based on a pressure difference detected in the first concentration measurement state and a pressure difference detected in the second concentration measurement state.

When the capacity of the gas flow producing means is constant, then in accordance with the law of energy conservation, the flow velocity of the passing through the measurement passage and that of gas different in composition from the air also passing through the measurement passage are different from each other because of different densities. Since there is a correlation between density and the concentration of fuel vapor, the flow velocity varies depending on the concentration of fuel vapor. Since the flow velocity defines a pressure loss in the orifice, the concentration of fuel vapor is detected based on a pressure difference detected in the first concentration measurement state and a pressure difference detected in the second concentration measurement state.

Since the measurement passage is provided, the concentration of fuel vapor is detected without flowing gas through the purging passage. Therefore, it is not necessary to determine the concentration of fuel vapor during purge, and the air-fuel ratio can be controlled properly while purging fuel vapor efficiently.

Besides, since an orifice is not installed in the purging passage, there is no fear that the flow of gas in the purging passage may be obstructed by an orifice.

DETAILED DESCRIPTION OF THE PREFERRED EMBODIMENTS

First Embodiment

Figure 1:
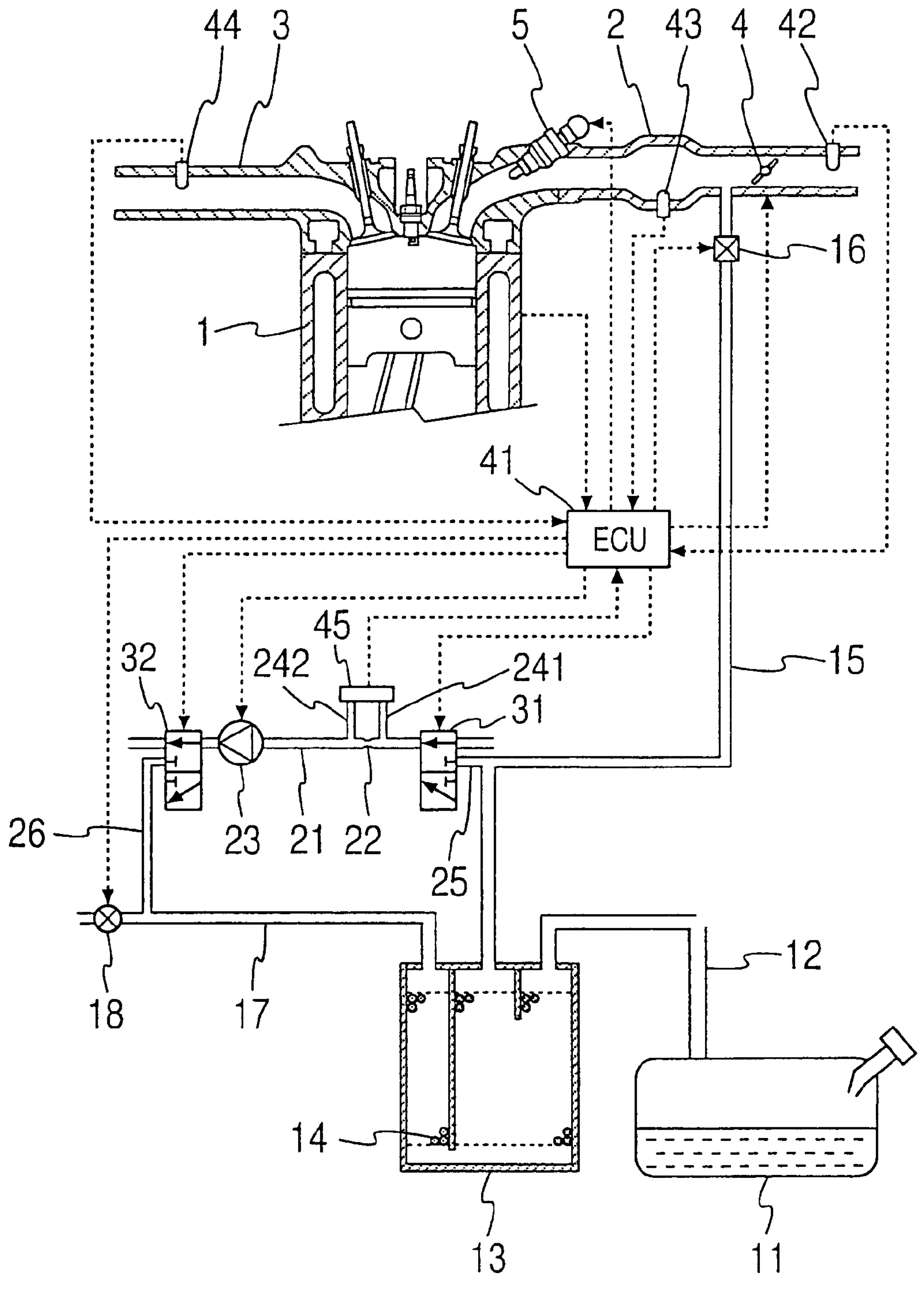
FIG. 1 is a construction diagram of a fuel vapor treatment system for an internal combustion engine according to a first embodiment of the present invention.

FIG. 1 shows the construction of a fuel vapor treatment system according to a first embodiment of the present invention. This embodiment is the application of the present invention to a vehicular engine. A fuel tank 11 for an internal combustion engine 1, which is referred to as an engine 1 hereinafter, is connected to a canister 13 through an inlet passage 12. The fuel tank 11 and the canister 13 are constantly in communication with each other. An adsorbing material 14 is loaded into the canister 13 to temporarily adsorb fuel evaporated within the fuel tank 11. The canister 13 is connected to an intake pipe 2 in the engine 1 through a purging passage 15. A purge valve 16 as a purge control valve is disposed in the purging passage 15. The canister 13 and the intake pipe 2 come into communication with each other, when the purge valve 16 is opened.

The purge valve is an electromagnetic valve, of which opening degree is adjusted by, for example, duty control with use of an electronic control unit (ECU) 41 which controls various portions of the engine 1. In accordance with the opening degree, fuel vapor desorbed from the adsorbing material 14 is purged into the intake pipe 2 by virtue of a negative pressure in the intake pipe 2 and burns together with fuel injected from an injector 5. The air-fuel mixture containing purged fuel vapor will hereinafter be referred to as "purged gas".

A purged air passage 17 which is opened to the atmosphere at a front end thereof is connected to the canister 13. A closing valve 18 is disposed in the purged air passage 17.

The purging passage 15 and the purged air passage 17 can be connected with each other through a fuel vapor passage 21 as a measurement passage. On the canister 13 side rather than the purge valve 16, the fuel vapor passage 21 connects to the purging passage 15 through a branch passage 25 which branches from the purging passage 15. On the canister 13 side rather than the closing valve 18, the fuel vapor passage 21 connects to the purged air passage 17 through a branch passage 26 which branches from the purged air passage 17. In the fuel vapor passage 21, there are disposed a first switching valve 31, an orifice 22, a pump 23 and a second switching valve 32 in this order from the purging passage 15 side.

The first switching valve 31 is an electromagnetic valve of a three-way valve structure which makes switching between a first concentration measurement state in which the fuel vapor passage 21 is open to the atmosphere at one end thereof and a second concentration measurement state in which the fuel vapor passage 21 comes into communication with the canister 13 at the one end thereof. The ECU 41 controls the first switching valve in these two switching states selectively. The ECU 41 is preset such that when the first switching valve 31 is OFF, the state of switching is the first concentration measurement state in which the fuel vapor passage 21 is opened to the atmosphere.

The pump 23 as gas flow producing means is an electric pump. When operating, its first switching valve 31 side serves as a suction side to let gas flow along and into the fuel vapor passage 21. The ECU 41 controls Its ON/OFF operation and number of revolutions. The number of revolutions is controlled so as to become constant upon reaching a preset value.

The second switching valve 32 is an electromagnetic valve of a three-way valve structure which switches between a first concentration measurement state in which the fuel vapor passage 21 opens to the atmosphere at the other end thereof and a second concentration measurement state in which the other end of the fuel vapor passage 21 comes into communication with the purged air passage 17. The ECU 41.controls the second switching valve 32 to these two switching states selectively. The ECU 41 is preset such that when the second switching valve 32 is OFF, the state of switching is the first concentration measurement state in which the fuel vapor passage 21 is open to the atmosphere.

At both ends of the orifice 22 the fuel vapor passage 21 is connected to a differential pressure sensor 45 as differential pressure detecting means through pressure conduits 241 and 242, and a pressure difference at both ends of the orifice 22 is detected by the differential pressure sensor 45. A detected differential pressure signal is outputted to the ECU 41.

The ECU 41 has a structure and functions for the ordinary type of engines. With the ECU 41, various portions, including a throttle 4 disposed in the intake pipe 2 to adjust the amount of intake air and an injector 5 for the injection of fuel, are controlled in accordance with the amount of intake air detected by an air flow sensor 42 disposed in the intake pipe 2, an intake pressure detected by an intake pressure sensor 43, an air-fuel ratio detected by an air-fuel ratio sensor 44 disposed in an exhaust pipe 3, as well as an ignition signal, engine speed, engine cooling water temperature and an accelerator position. This control is performed so as to afford proper fuel injection quantity and throttle angle.

Figure 2:
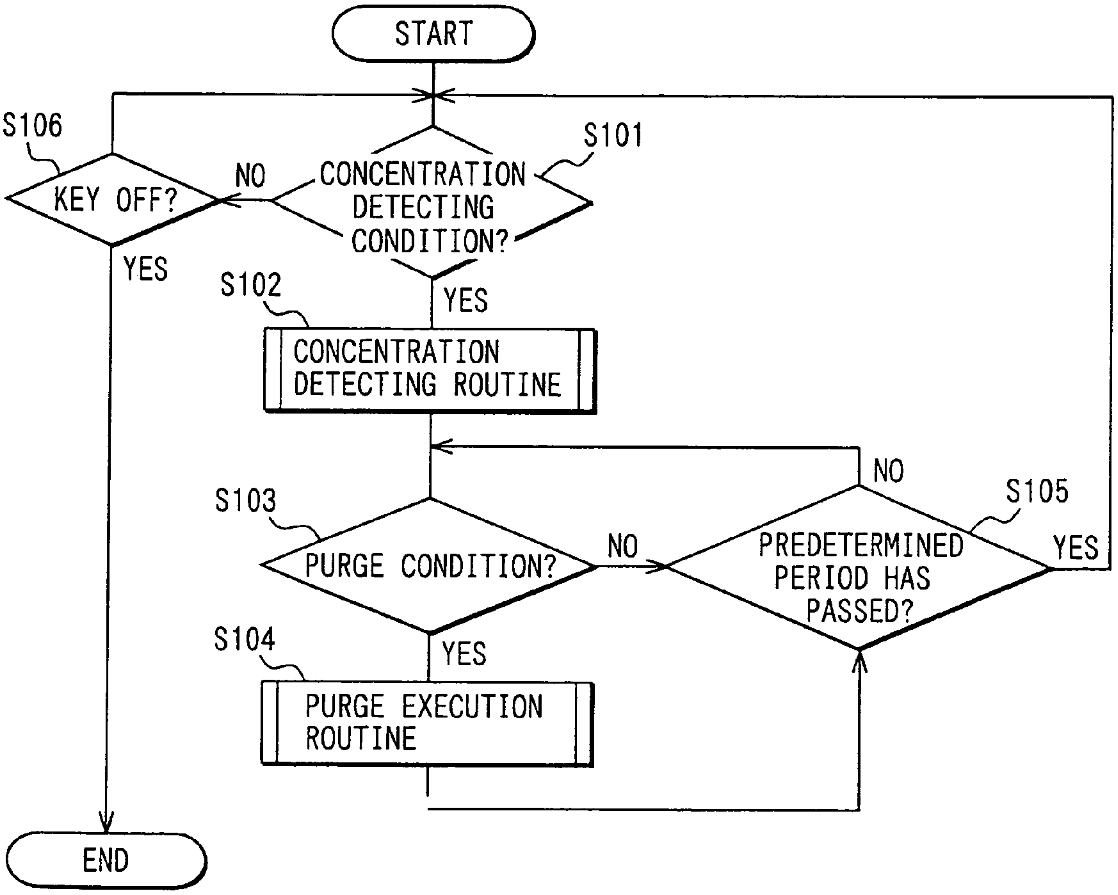
FIG. 2 is a first flow chart showing the operation of the fuel vapor treatment system.

FIG. 2 shows a fuel vapor purging flow executed by ECU 41. This flow is executed upon start-up of the engine. In Step S101 it is determined whether a concentration detecting condition exists or not. The concentration detecting condition exists when state quantities indicative of operating states such as engine water temperature, oil temperature and engine speed lie predetermined regions. The concentration detecting condition is set so as to be established before establishment of a purge execution condition regarding whether the execution of fuel vapor purging to be described later is to be allowed or not.

For example, the purge execution condition is established when the engine cooling water temperature becomes a predetermined value T1 or higher and it is determined that warming-up of the engine is completed. The concentration detecting condition is established during warming-up of the engine, but for example it is established when the cooling water temperature corresponds to a predetermined value T2 or higher which value T2 is set lower than the above predetermined value T1. The concentration detecting condition is established also during the period (mainly during deceleration) in which the engine is operating and the purging of fuel vapor is stopped. In the case where this fuel vapor treatment system is applied to a hybrid vehicle, the concentration detecting condition is established even when the engine is stopped and the vehicle is running by means of a motor.

When the answer in Step S101 is affirmative, the processing flow advances to Step S102, in which a concentration detecting routine to be described later is executed. When the answer in Step S101 is negative, the processing flow shifts to Step S106, in which it is determined whether the ignition key is OFF or not. When the answer in Step S106 is negative, the processing flow returns to Step S101. When the ignition key is OFF, the processing flow is ended.

Figure 3:
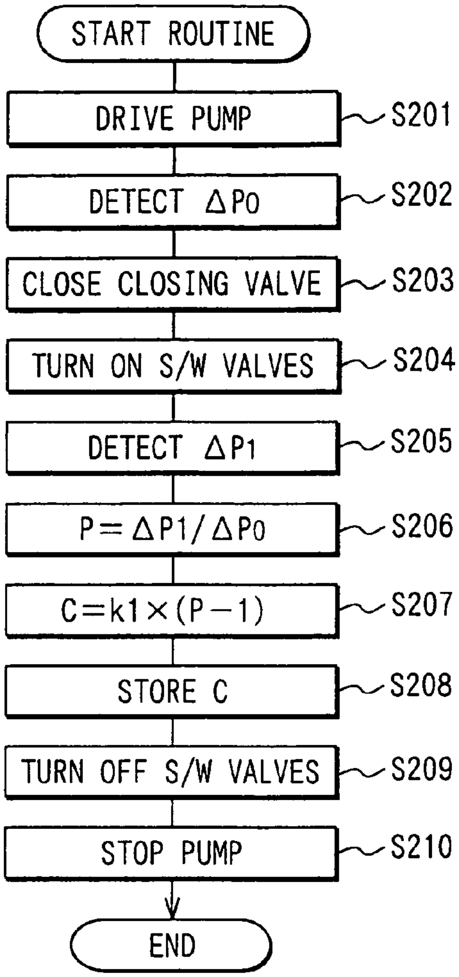
FIG. 3 is a second flow chart showing the operation of the fuel vapor treatment system.
Figure 4:
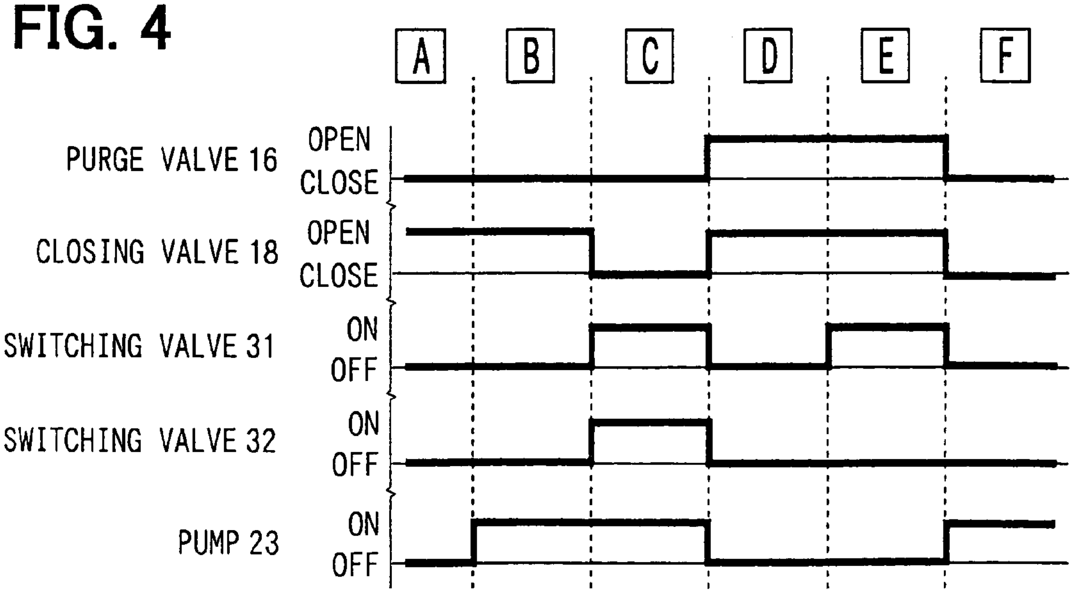
FIG. 4 is a timing chart showing the operation of the fuel vapor treatment system.
Figure 5:
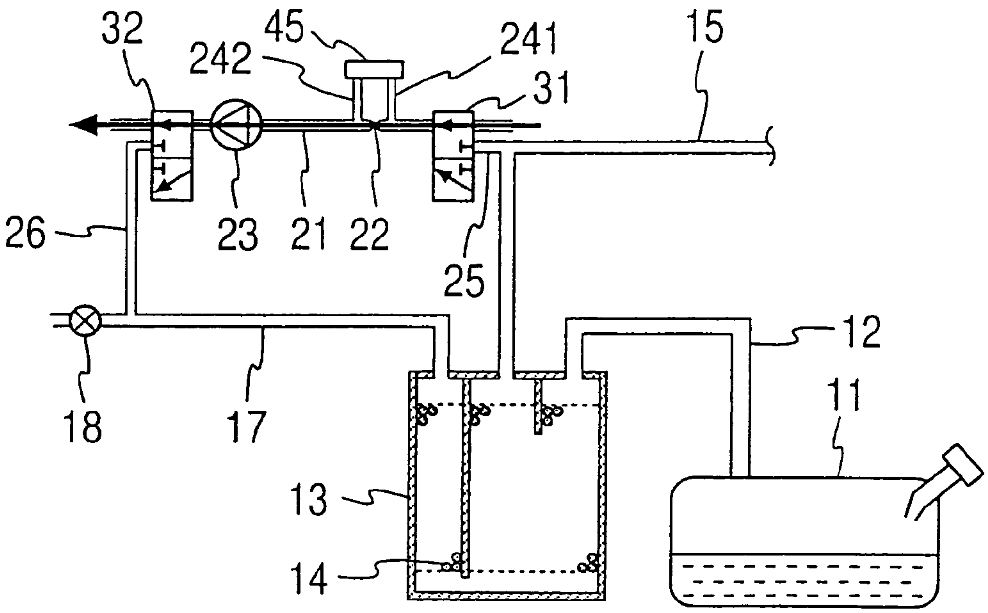
FIG. 5 is a first diagram showing the flow of gas in principal portions of the fuel vapor treatment system.

FIG. 3 shows the contents of the concentration detecting routine and FIG. 4 shows changes in state of various components of the system during execution of the concentration detecting routine. In executing the concentration detecting routine, an initial state is such that the purge valve 16 is closed, the closing valve 18 is open, the first and second switching valves 31, 32 are OFF, and the pump 23 is OFF (A in FIG. 4). This state corresponds to the foregoing first concentration measurement state. In Step S201, the pump 23 is activated, causing gas to flow through the fuel vapor passage 21 (B in FIG. 4). The gas, which is air, flows through the fuel vapor passage 21 as indicated by arrow in FIG. 5 and is again discharged into the atmosphere. In Step S202, a differential pressure ΔP0 in the orifice 22 in this state is detected. In Step S203, the closing valve 18 is closed and the first and second switching valves 31, 32 are turned ON (C in FIG. 4). A shift is made from the first to the second concentration measurement state. At this time, since the purge valve 16 and the closing valve 18 are closed, the gas flows along an annular path circulating between the canister 13 and the orifice 22. The gas is an air-fuel mixture containing fuel vapor because it passes through the canister 13.

In Step S205, a differential pressure ΔP1 in the orifice 22 is detected in this state.

Subsequent Steps S206 and S207 are processes performed by fuel vapor concentration calculating means. In Step S206, a differential pressure ratio P is calculated based on the two detected differential pressures ΔP0 and ΔP1 and in accordance with Equation (1). In Step S207, the fuel vapor concentration C is calculated based on the differential pressure ratio P and in accordance with Equation (2). In Equation (2), k1 is a constant and is stored beforehand in ROM of ECU 41 together with control programs.

$$P=\Delta P1/\Delta P0 \tag{1}$$

$$C=k1\times(P-1)(=k1\times(\Delta P1-\Delta P0)/\Delta P0) \tag{2}$$

Figure 7:
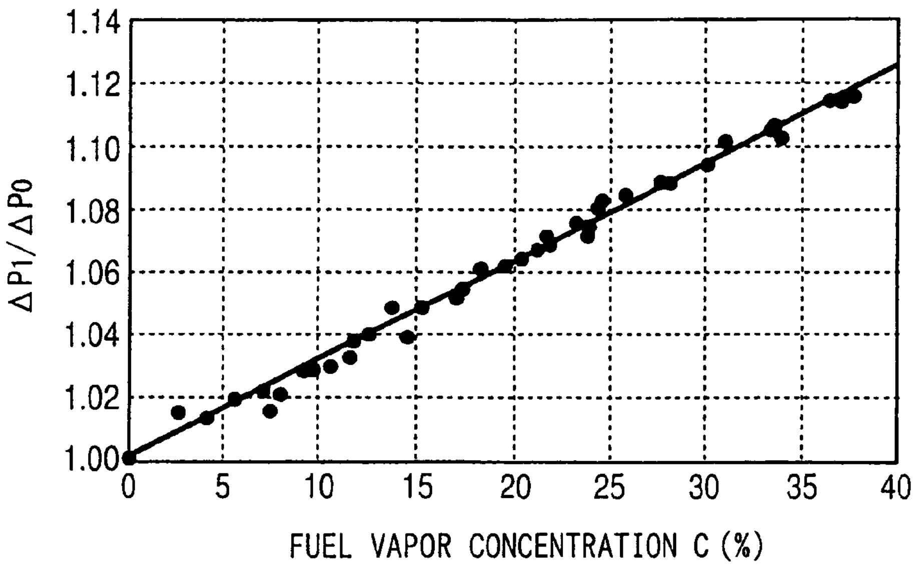
FIG. 7 is a first graph explaining the operation of the fuel vapor treatment system.

When fuel vapor is contained in the purged gas, the density becomes high because the fuel vapor is heavier than air. Under the same number of revolutions of the pump 23 and the same flow velocity (flow rate) in the fuel vapor passage 21, the differential pressure in the orifice 22 becomes large in accordance with the law of energy conservation. The higher the fuel vapor concentration C, the larger the differential pressure ratio P. As shown in FIG. 7, a characteristic line which the fuel vapor concentration C and the differential pressure ration P follow becomes a straight line. Equation (2) expresses such a characteristic line. The constant k1 is fitted beforehand by experiment or the like.

Figure 8:
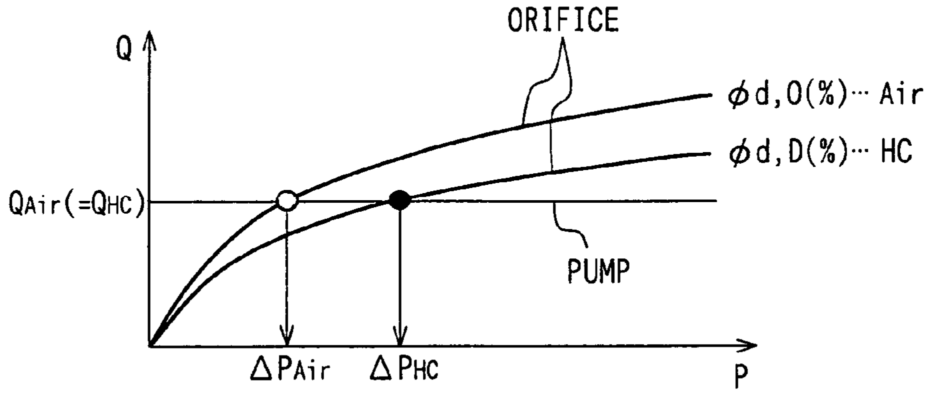
FIG. 8 is a second graph explaining the operation of the fuel vapor treatment system.

FIG. 8 shows a pressure P—flow rate Q characteristic ("pump characteristic" hereinafter).

A differential pressure ΔP—flow rate Q characteristic ("orifice characteristic") in the orifice 22 is also shown in the same figure. The pressure P is equal to the differential pressure ΔP because the pressure loss in the other portions than the orifice 22 is small. The orifice characteristic can be expressed by Equation (3), assuming that the density of fluid flowing through the orifice 22 is ρ. In Equation (3), K is a constant and $K=\alpha\times\pi\times d^2/4\times 2^{1/2}$ in which d is a hole diameter of the orifice 22 and α is a flow coefficient of the orifice 22.

$$Q=K(\Delta P/\rho)^{1/2} \tag{3}$$

Thus, Equations (3-1) and (3-2) are valid respectively when the fluid flowing through the orifice 22 is air (Air in the figure, also in the following) and when the said fluid is air (HC in the figure, also in the following) containing fuel vapor. As to the subscripts in the equations, Air indicates that the fluid is air and HC indicates that the fluid is air containing fuel vapor.

$$Q_{Air}=K(\Delta P_{Air}/\rho_{Air})^{1/2} \tag{3-1}$$

$$Q_{HC}=K(\Delta P_{HC}/\rho_{HC})^{1/2} \tag{3-2}$$

As described above, since the pump 23 is controlled so that its number of revolutions becomes constant, $Q_{Air}=Q_{HC}$ and Equation (4) exists:

$$\rho_{HC}/\rho_{Air}=\Delta P_{HC}/\Delta P_{Air} \tag{4}$$

Since density depends on the fuel vapor concentration, the fuel vapor concentration is known with the differential pressure ratio $\Delta P_{HC}/\Delta P_{Air}$ as parameter. Learning of the pump characteristic is not necessary. $\Delta P_{HC}$ and $\Delta P_{Air}$ are ΔP1 and ΔP0, respectively.

The following effect is further obtained by controlling the number of revolutions of the pump 23 to a constant value.

Figure 9:
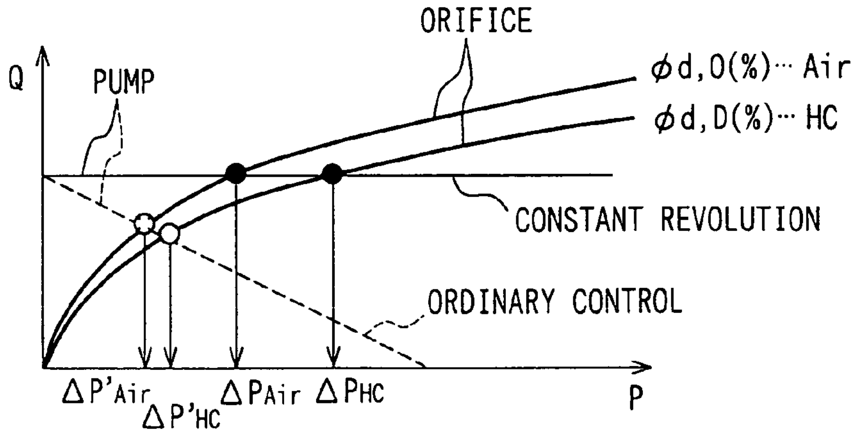
FIG. 9 is a third graph explaining the operation of the fuel vapor treatment system.

FIG. 9 shows the characteristic (orifice characteristic) of the orifice 22 and the characteristic (pump characteristic) of the pump 23. In the case of an ordinary control wherein the constant revolution control is not performed, the number of revolutions lowers as the pressure increases and so does the load, resulting in that the pump characteristic changes like a broken line in FIG. 9, that is, the flow rate lowers together with the differential pressures. Consequently, the differential pressures which are measured become $\Delta P'_{Air}$ and $\Delta P'_{HC}$. When the constant revolution control is performed, the differential pressures become $\Delta P_{Air}$ and $\Delta P_{HC}$ as described above, so that it is possible to obtain a larger gain than in the ordinary control.

When the number of revolutions of the pump 23 is small, the differential pressure ΔP becomes small and the fuel vapor concentration measuring accuracy becomes low, while when the number of revolutions of the pump 23 is too large, the differential pressure ΔP becomes large, affecting the operation of the switching valves 31 and 32. Therefore, it is preferable to set the number of revolutions of the pump 23 while taking such a point into account.

In Step 208, the fuel vapor concentration C obtained is stored temporarily.

In Step S209, the first and second switching valves 31, 32 are turned OFF, and in Step S210, the pump 23 is turned OFF. This state is the same as A in FIG. 4, which is the state prior to start of the concentration detecting routine.

After execution of the concentration detecting routine (Step S102), it is determined in Step S103 whether the purge execution condition exists or not. As in the ordinary type of fuel vapor treatment systems, the purge execution condition is determined based on such operating conditions as engine water temperature, oil temperature, and engine speed.

When the answer in Step S103 for determining whether the purge execution condition exists or not is affirmative, a purge execution routine is carried out in Step S104. When the purge execution condition does not exist, that is, when the answer in Step S103 is negative, it is determined in Step S105 whether a predetermined time has elapsed or not after execution of the concentration detecting routine. When the answer in Step S105 is negative, the processing of Step S104 is repeated. When the answer in Step S105 for determining whether the predetermined time has elapsed or not after execution of the concentration detecting routine is affirmative, the processing flow returns to Step S101, in which the processing for obtaining the fuel vapor concentration C is again executed and the fuel vapor concentration C is updated to the latest value (Steps S101, S102). The aforesaid predetermined time is set based on the accuracy of a concentration value which is required taking changes with time of the fuel vapor concentration C into account.

Figure 10:
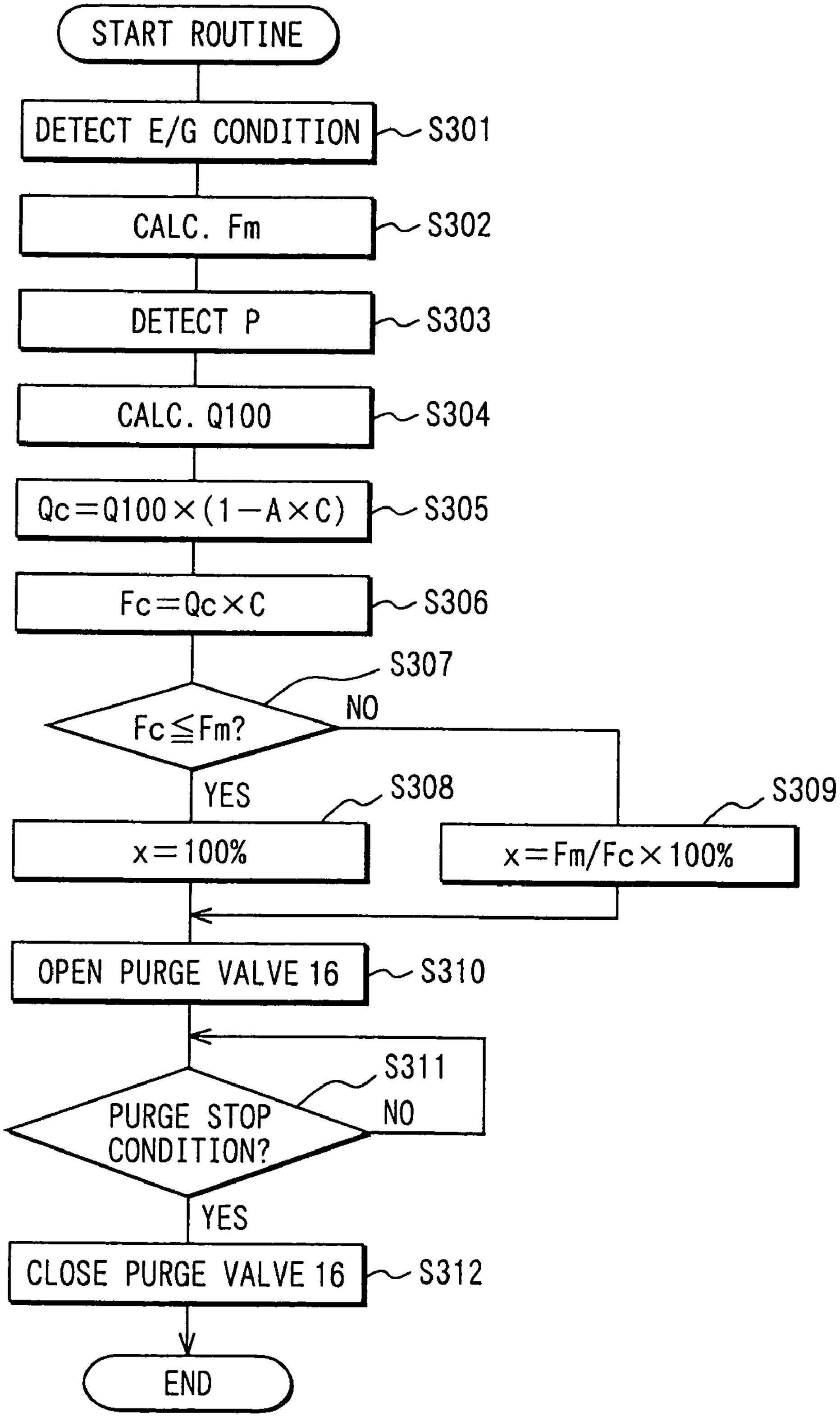
FIG. 10 is a third flow chart showing the operation of the fuel vapor treatment system.

FIG. 10 shows the details of the purge execution routine. The processes of Steps S301 and S302 are carried out by an allowable-purge-flow-rate-upper-limit-value setting means. In Step S301, operating conditions of the engine are detected, while in Step S302, an allowable-purged-fuel-vapor-flow-rate value Fm is calculated based on the detected engine operating conditions. The allowable-purged-fuel-vapor-flow-rate value Fm is calculated based on a fuel injection quantity which is required under current engine operating conditions such as throttle angle and also based on a lower-limit value of a fuel injection quantity capable of being controlled by the injector 5. A large fuel injection quantity acts in a direction in which the ratio of the purged fuel vapor flow rate to the fuel injection quantity becomes lower, so that the allowable-purged-fuel-vapor-flow-rate value Fm also becomes large.

Figure 11:
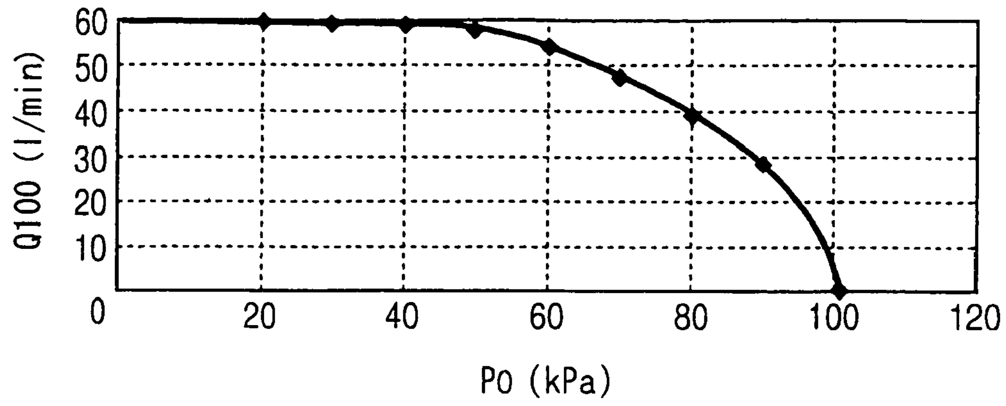
FIG. 11 is a fourth graph explaining the operation of the fuel vapor treatment system.

In Step S303, the present intake pipe pressure P0 is detected, while in Step S304, a reference flow rate Q100 is calculated based on the intake pipe pressure P0. The reference flow rate Q100 represents the flow rate of gas flowing through the purging passage 15 when the flowing fluid is air 100% and when the degree of opening of the purge valve 16 ("purge valve opening" hereinafter) is 100%. It is calculated in accordance with a reference flow map. FIG. 11 shows an example of the reference flow map.

Figure 12:
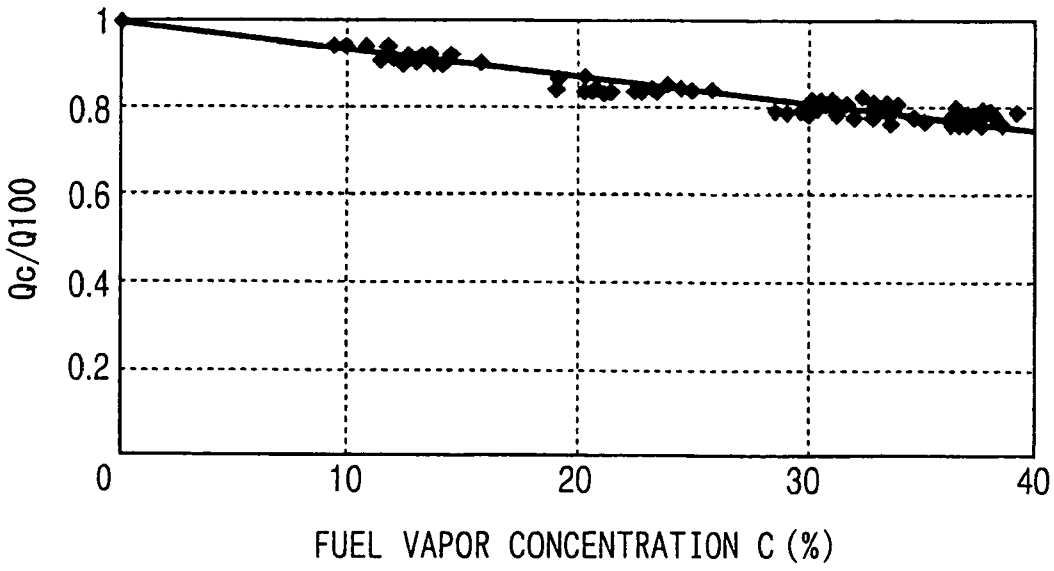
FIG. 12 is a fifth graph explaining the operation of the fuel vapor treatment system.

In Step S305, an estimated flow rate Qc of purged air-fuel mixture is calculated based on the fuel vapor concentration C detected in the concentration detecting routine and in accordance with Equation (5). The estimated flow rate Qc is an estimated value of purged gas flow rate when the purged valve opening is set at 100% and when purged gas of the present fuel vapor concentration C is allowed to flow through the purging passage 15. FIG. 12 shows a relation between the fuel vapor concentration C and the ratio (Qc/Q100) of the estimated flow rate Qc to the reference flow rate Q100. The density of purged gas increases as the fuel vapor concentration C becomes higher, and even under the same intake pipe pressure, the flow rate decreases in comparison with the case where purged gas is air 100% in accordance with the law of energy conservation. The straight line in the figure is equivalent to Equation (5). In Equation (5), "A" is a constant, which is stored beforehand in ROM of ECU 41 together with control programs.

$$Qc=Q100\times(1-A\times C) \tag{5}$$

In Step S306, based on the fuel vapor concentration C and estimated flow rate Qc and in accordance with Equation (6), there is calculated an estimated flow rate ("estimated purged fuel vapor flow rate" hereinafter) Fc of purged fuel vapor at a purged valve opening of 100% and with purged gas of the present fuel vapor concentration C flowing through the purging passage 15.

$$Fc=Qc\times C \tag{6}$$

The process of Steps S307 to S309 are performed by degree-of-opening setting means. In Step S307, the estimated purged fuel vapor flow rate Fc is compared with the allowable-purged-fuel-vapor-flow-rate value Fm and it is determined whether Fc≦Fm or not. When the answer is affirmative, the processing flow advances to Step S308, in which the opening degree "x" of the purge valve is set at 100%. This is because there is a margin up to the allowable-purged-fuel-vapor-flow-rate value even when the opening degree "x" of the purged value is set at 100%.

When the answer in Step S307 for determining whether Fc≦Fm or not is negative, it is determined that at a purge valve opening "x" of 100% it is impossible to carry out the air-fuel ratio control properly due to surplus fuel vapor, and the processing flow advances to Step S309, in which the purged valve opening "x" is set at (Fm/Fc)×100%. This is because under the relation of Fc>Fm the maximum purge flow rate at which the proper air-fuel ration control is guaranteed corresponds to allowable-purged-fuel-vapor-flow-rate value Fm.

After the execution of Steps S308 and S309, the purged valve 16 is opened in Step S310. The degree of opening at this time corresponds to the degree of opening (D in FIG. 4) set in Step S308 or S309.

In Step S311 it is determined whether a purge stop condition exists or not. A shift to the next Step S312 is not made until the answer in Step S311 becomes affirmative.

When the purge stop condition is established, the purge valve 16 is closed in Step S312.

After execution of the purge execution routine (Step S104), the processing flow advances to Step S105.

Figure 13:
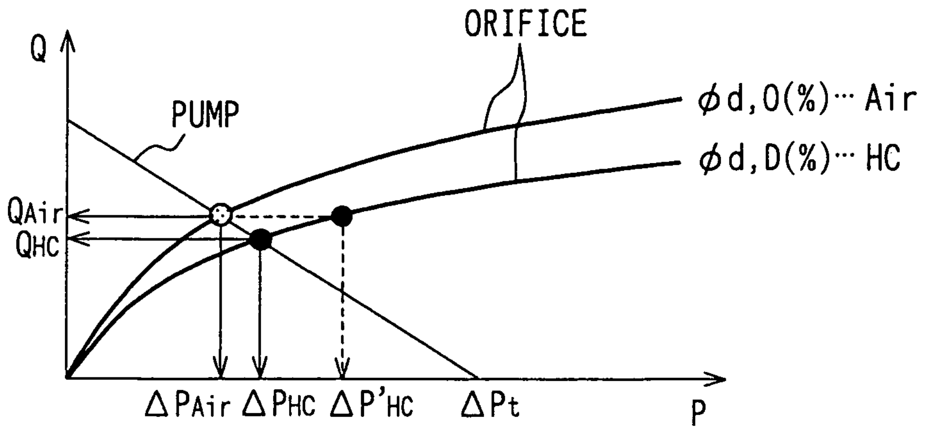
FIG. 13 is a graph explaining a modification of the fuel vapor treatment system.
Figure 14:
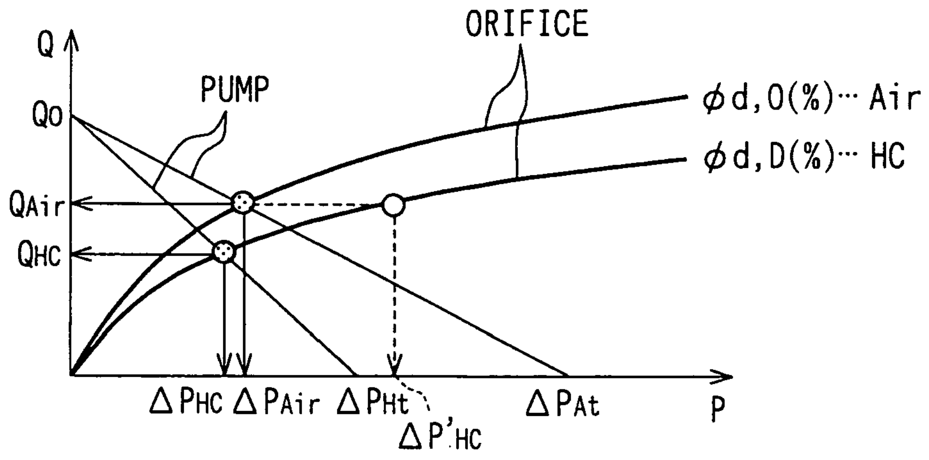
FIG. 14 is a graph explaining another modification of the fuel vapor treatment system.

Although in this embodiment the pump 23 is controlled to a constant number of revolutions, this does not always constitute a limitation. In this case, learning (measurement) of characteristics of the pump 23 is necessary, but the contents thereof differ depending on the structure of the pump 23. An explanation will now be given about this point. FIGS. 13 and 14 show pump characteristics wherein the flow rate Q depends on pressure P (differential pressure ΔP). Orifice characteristics are also shown in the figures. FIG. 13 is of the case in which pump characteristics are influenced by the fuel vapor concentration (and hence the viscosity of working fluid) and FIG. 14 is of the case in which pump characteristics are influenced by the fuel vapor concentration. In the latter, as is the case with orifice characteristics, there are shown a pump characteristic of the case where the working fluid in pump 23 is air alone and a pump characteristic of the case where fuel vapor is contained in air. In the former case where pump characteristics are not influenced by the fuel vapor concentration, the pump used is of an internal leakage-free structure like a diaphragm pump for example, while in the latter case where pump characteristics are influenced by the fuel vapor concentration, the pump used is of a structure involving internal leakage like a vane pump. This is because in the structure involving internal leakage the internal leakage quantity varies under the influence of physical properties of the working fluid.

A description will now be given about the case where pump characteristics are not influenced by the fuel vapor concentration (FIG. 13). The pump characteristics in this case can be represented by Equation (7), in which K1 and K2 are constants. Assuming that a no-discharge pressure is $P_t$, K2=−K1×$P_t$ from the condition of Q=0 when P=$P_t$.

$$Q=K1\times P+K2 \tag{7}$$

Therefore, Equations (7-1) and (7-2) are valid respectively when the fluid passing through the orifice 22 is air and when it is air containing fuel vapor.

$$Q_{Air}=K1\times\Delta P_{Air}+K2=K1(\Delta P_{Air}-P_t) \tag{7-1}$$

$$Q_{HC}=K1\times\Delta P_{HC}+K2=K1(\Delta P_{HC}-P_t) \tag{7-2}$$

As to orifice characteristics, the foregoing Equations (3), (3-1) and (3-2) are valid.

Since the Equation (3-1) is equal to the Equation (7-1) in the first concentration measurement state, Equation (8) is obtained.

$$K(\Delta P_{Air}/\rho_{Air})^{1/2}=K1(\Delta P_{Air}-P_t) \tag{8}$$

Transformation of Equation (8) gives Equation (9).

$$\rho_{Air}=(K^2\times\Delta P_{Air})/\{K1^2\times(\Delta P_{Air}-P_t)^2\} \tag{9}$$

Likewise, since (3-2)=(7-2) in the second concentration measurement state, Equation (10) is obtained.

$$\rho_{HC}=(K^2\times\Delta P_{HC})/\{K1^2\times(\Delta P_{HC}-P_t)^2\} \tag{10}$$

Equation (11) is obtained from Equations (9) and (10).

$$\rho_{HC}/\rho_{Air}=(\Delta P_{HC}/\Delta P_{Air})\times\{(\Delta P_{Air}-P_t)/(\Delta P_{HC}-P_t)\}^2 \tag{11}$$

Thus, for obtaining the fuel vapor concentration, the no-discharge pressure $P_t$ is measured as a pump characteristic in addition to $\Delta P_{Air}$ and $\Delta P_{HC}$.

The following description is now provided about the case where pump characteristics are influenced by the fuel vapor concentration (FIG. 14). In the pump characteristics of this case, K1 and K2 in Equation (7) depend on the fuel vapor concentration. Given that Q in a no-load condition of the pump ($\Delta P_{Air}=0$, $\Delta P_{HC}=0$) is $Q_0$, the no-discharge pressure in case of the working fluid being air is $P_{At}$, and the no-discharge pressure in case of the working fluid being air containing fuel vapor is $P_{Ht}$, $K1=-Q_0/P_{At}$ and $K1'=-Q_0/P_{Ht}$. Therefore, Equation (7-1') is valid when the fluid flowing through the orifice 22 is air and Equation (7-2') is valid when the said fluid is an air-fuel mixture containing fuel vapor.

$$Q_{Air}=K1\times\Delta P_{Air}+K2=Q_0\times(1-\Delta P_{Air}/P_{At}) \quad (7\text{-}1')$$

$$Q_{HC}=K1'\times\Delta P_{HC}+K2'=Q_0\times(1-\Delta P_{HC}/P_{Ht}) \quad (7\text{-}2')$$

As described earlier, since the Equation (3-1) is equal to the Equation (7-1') in the first concentration measurement state, Equation (12) is established.

$$\rho_{Air}=(K^2\times\Delta P_{Air})/\{Q_0^2\times(1-\Delta P_{Air}/P_{At})^2\} \quad (12)$$

Likewise, in the second concentration measurement state, Equation (13) is established since the Equation (3-2) is equal to the Equation (7-2').

$$\rho_{HC}=(K^2\times\Delta P_{HC})/\{Q_0^2\times(1-\Delta P_{HC}/P_{Ht})^2\} \quad (13)$$

Equation (14) is obtained from Equations (12) and (13).

$$\rho_{HC}/\rho_{Air}=(\Delta P_{HC}/\Delta P_{Air})\times\{(1-\Delta P_{Air}/P_{At})/(1-\Delta P_{HC}/P_{Ht})\}^2 \quad (14)$$

Therefore, for obtaining the fuel vapor concentration, the no-discharge pressures $P_{At}$ and $P_{Ht}$ are measured in addition of $\Delta P_{Air}$ and $\Delta P_{HC}$.

Figure 15:
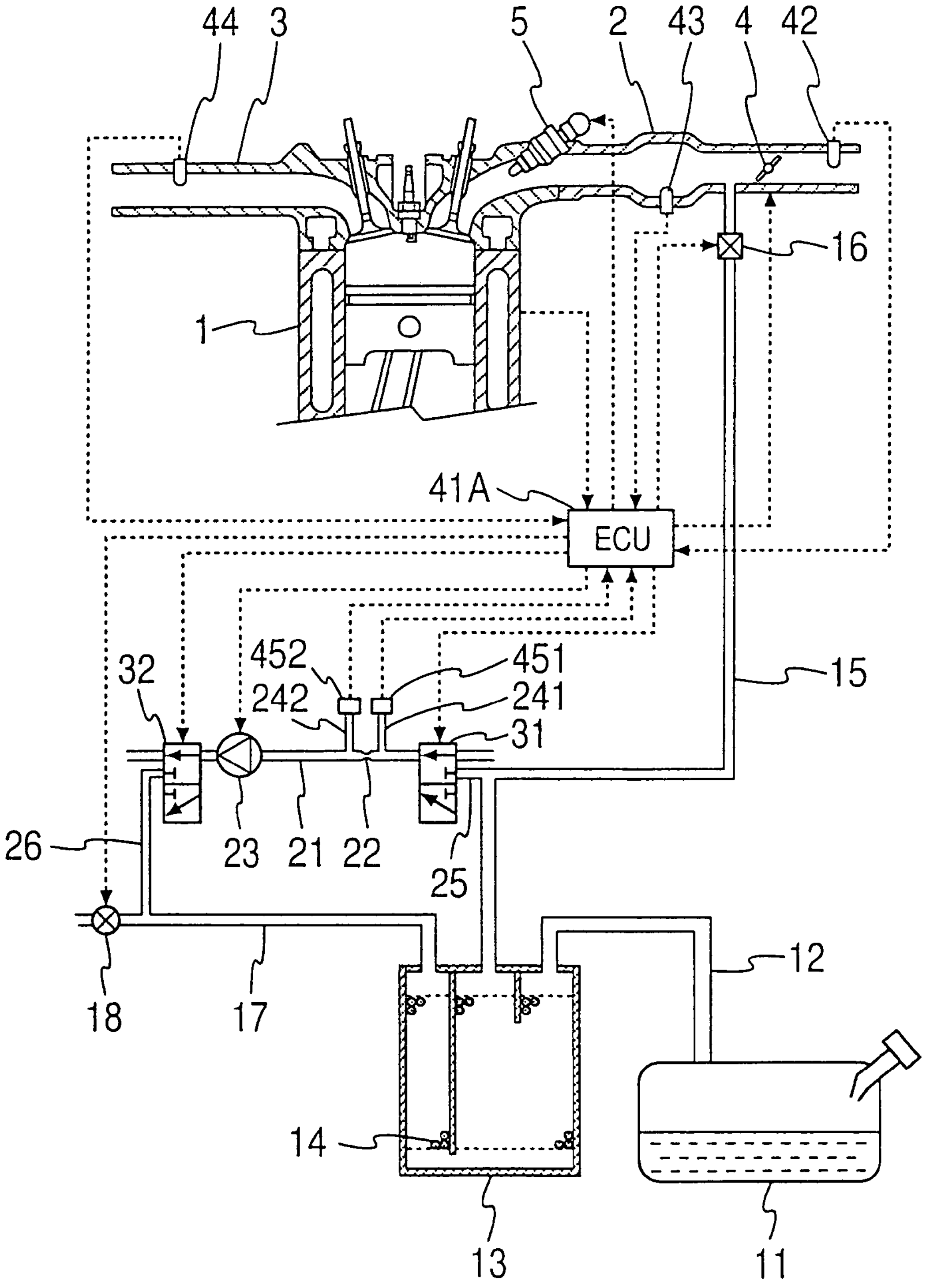
FIG. 15 is a construction diagram of a further modification of the fuel vapor treatment system.

In this embodiment, the differential pressure in the orifice 22 is detected by the differential pressure sensor 45. However, there may be adopted such a construction as shown in FIG. 15, in which pressure sensors 451 and 452 are respectively disposed immediately upstream and downstream of the orifice 22 and the difference between pressures detected by the two pressure sensors 451 and 452 is calculated by ECU 41A to obtain a differential value as a differential pressure in the orifice 22. The ECU 41A is substantially the same as the ECU 41 except that a differential pressure is obtained by calculation from pressures detected by the two pressure sensors 415 and 452.

Second Embodiment

Figure 16:
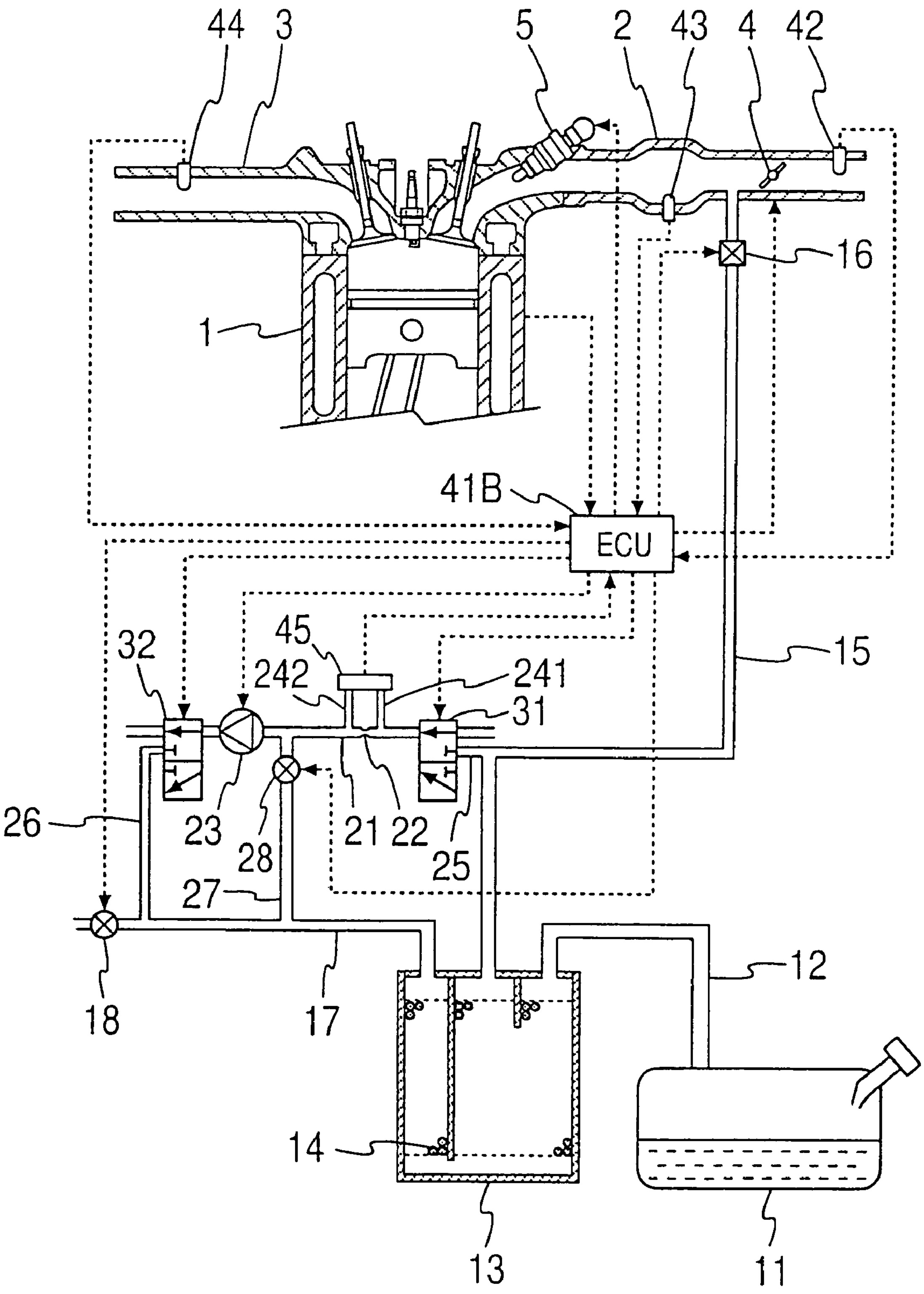
FIG. 16 is a construction diagram of a fuel vapor treatment system for an internal combustion engine according to a second embodiment of the present invention.

FIG. 16 shows the construction of an engine according to a second embodiment of the present invention. This construction corresponds to a replacement of a part of the construction of the first embodiment by another construction. Portions which perform substantially the same operations as in the first embodiment are identified by the same reference numerals as in the first embodiment and a description will be given below mainly about the difference from the first embodiment.

A bypass 27 is provided for connecting the fuel vapor passage 21 and the purged air passage 17 directly with each other without interposition of the pump 23 and the second switching valve 32. One end of the bypass 27 is in communication with the fuel vapor passage 21 at a position between the orifice 22 and the pump 23, while an opposite end thereof is in communication with the purging passage 17 on the canister 13 side rather than the branch passage 26. A bypass opening/closing valve 28 is disposed in the bypass 27. The bypass opening/closing valve 28 is a normally closed electromagnetic valve, which is opened or closed by control of the ECU 41B to cut off or provide communication between the fuel vapor passage 21 and the purged air passage 17 through the bypass 27.

Figure 17:
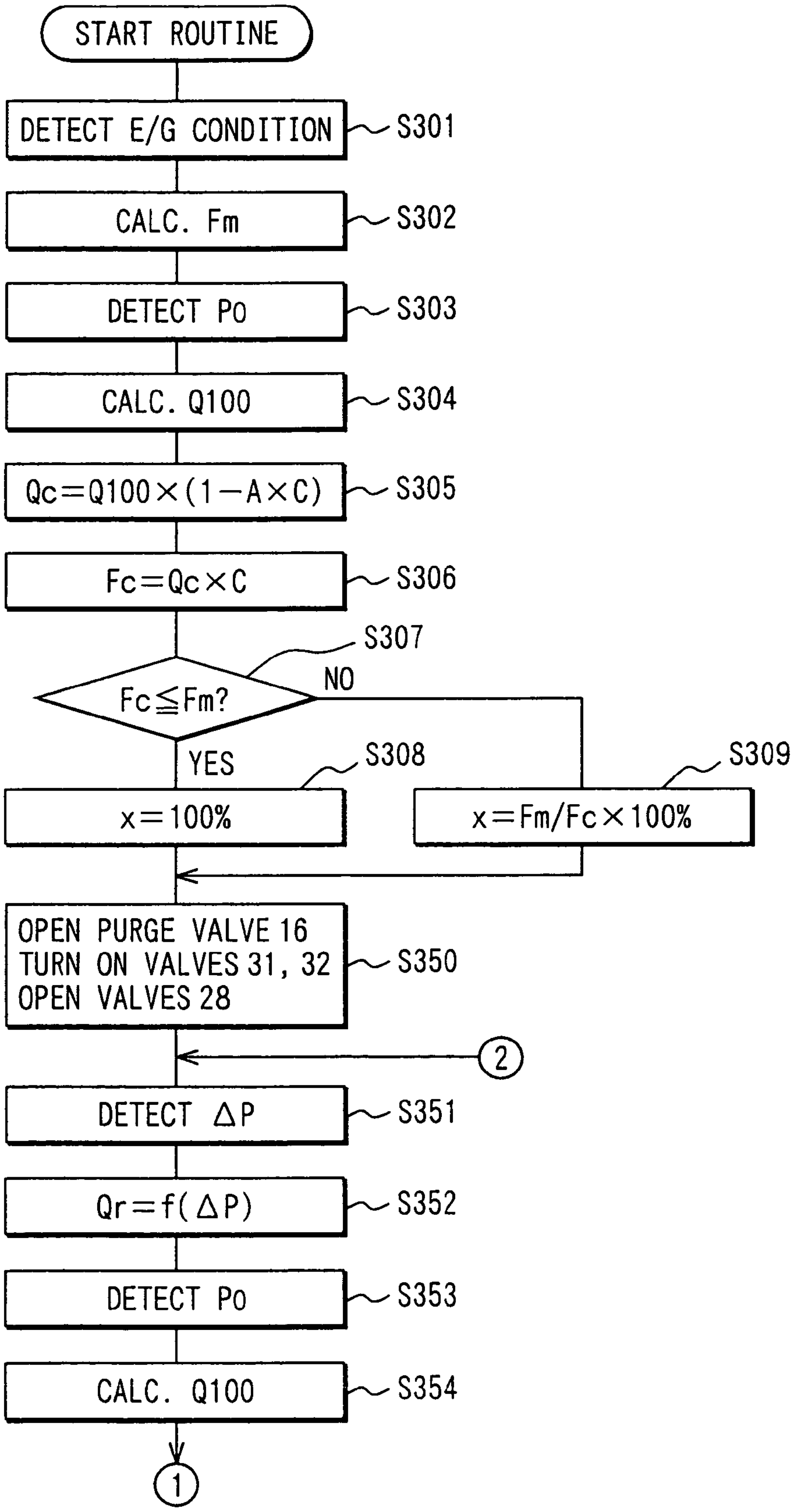
FIG. 17 is a first flow chart showing the operation of the fuel vapor treatment system of the second embodiment.
Figure 18:
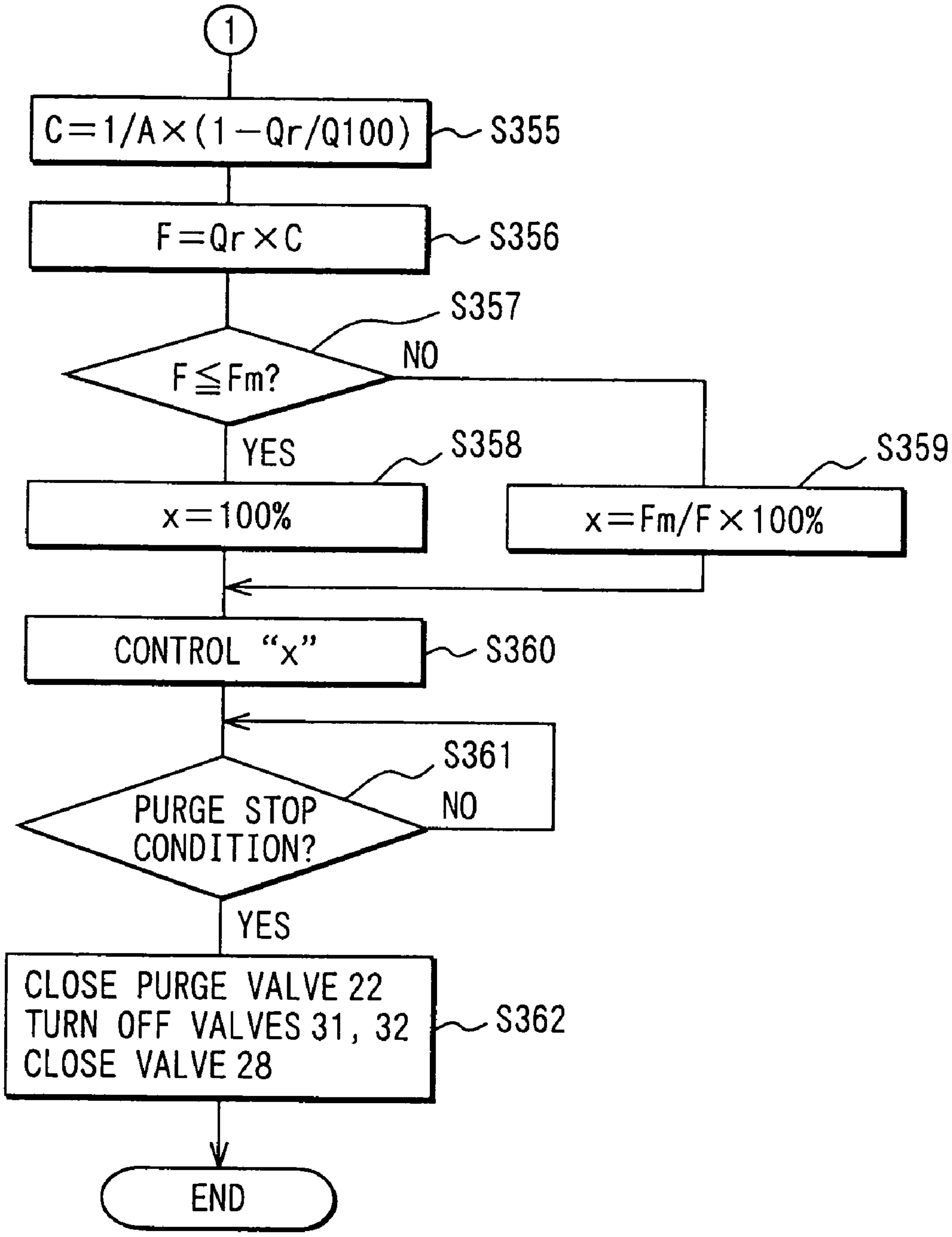
FIG. 18 is a second flow chart showing the operation of the fuel vapor treatment system of the second embodiment.

The ECU 41B is basically the same as the ECU used in the first embodiment. FIGS. 17 and 18 show a purge execution routine which is executed by the ECU 41B. As in the first embodiment, the allowable-purged-fuel-vapor-flow-rate value Fm is determined based on engine operating conditions and the estimated purged fuel vapor flow rate Fc is determined based on both fuel vapor concentration C and intake pipe pressure P0 (Steps S301 to S306). Then, the purge valve opening "x" is set based on the allowable-purged-fuel-vapor-flow-rate value Fm and the estimated purged fuel vapor flow rate Fc (Steps S307 to S309).

Figure 19:
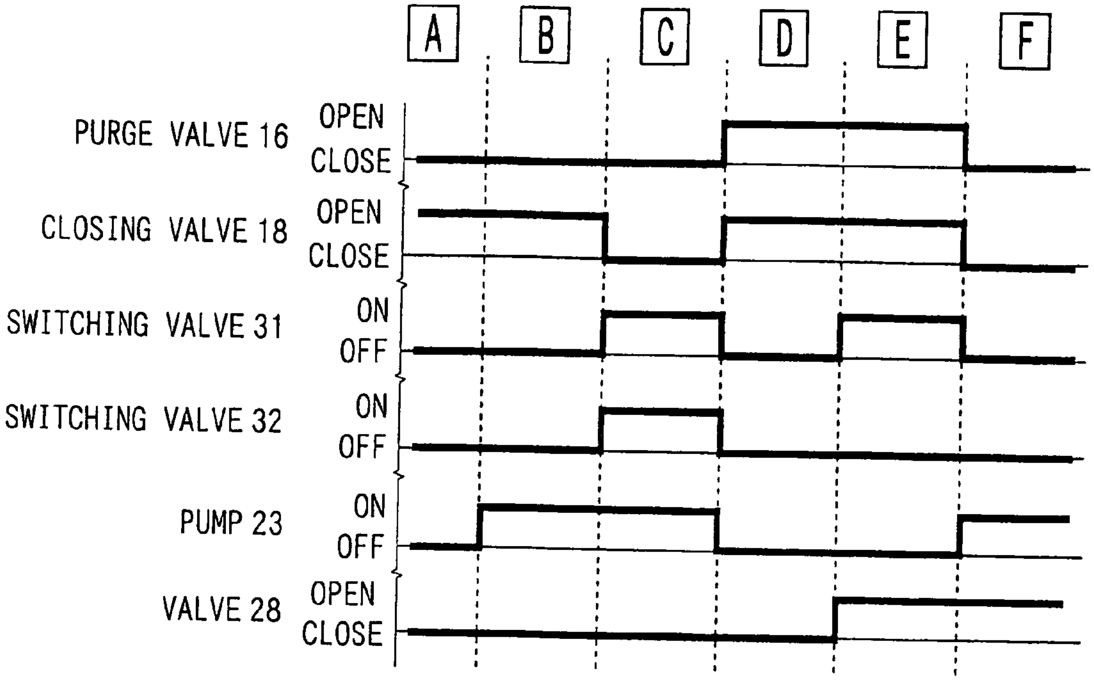
FIG. 19 is a timing chart showing the operation of the fuel vapor treatment system of the second embodiment.
Figure 20:
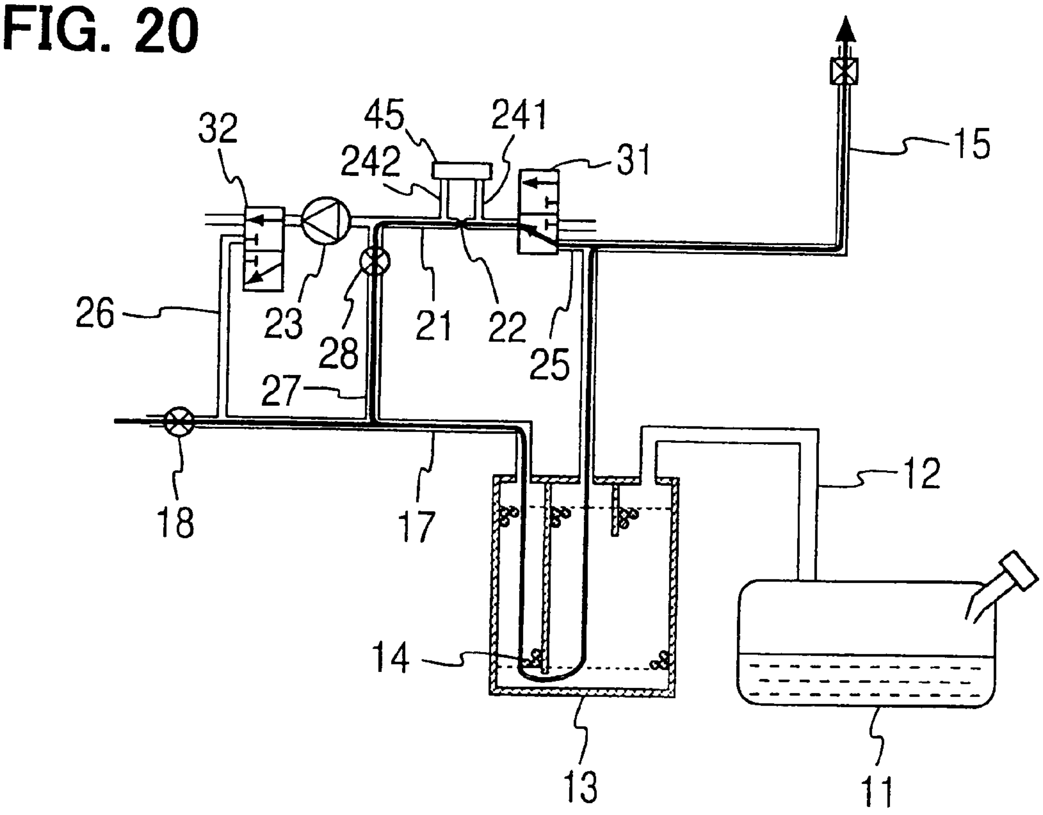
FIG. 20 is a diagram showing the flow of gas in principal portions of the fuel vapor treatment system of the second embodiment.

In Step S350 which follows, the purge valve 16 is opened at the purge valve opening "x", thus set and the first switching valve 31 and the bypass opening/closing valve 28 are turned ON (E in FIG. 19). A purging bypass is formed along which a portion of purged air passes through the bypass 27 and the orifice 22 while bypassing the canister 13 (FIG. 20).

Figure 21:
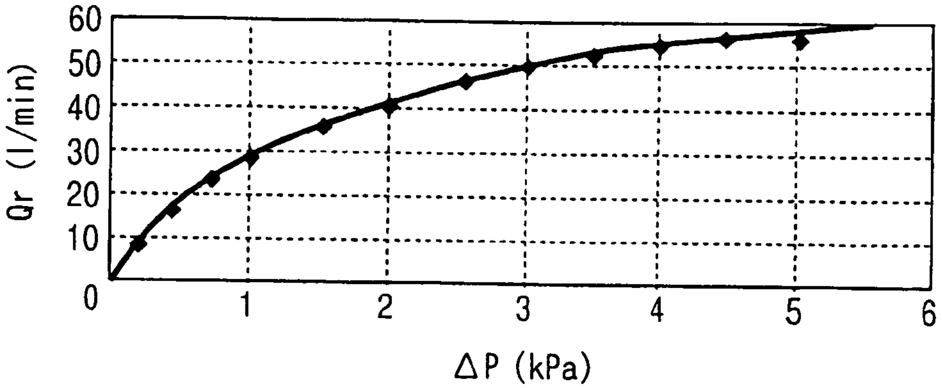
FIG. 21 is a graph explaining the operation of the fuel vapor treatment system of the second embodiment.

In Step S351, a differential pressure ΔP in the orifice 22 is detected, then in Step S352, an actual flow rate ("actual purge flow rate" hereinafter as the case may be) Qr of purged gas fed to the intake pipe 2 is calculated based on the detected differential pressure ΔP. As purged air, as described above, there are two types, one passing through the canister 13 and the other passing through the aforesaid purging bypass. The flow rate ratio is constant in proportion to the sectional areas of the respective passages. The differential pressure ΔP in the orifice 22 is proportional to the square of the flow rate of purged air passing through the orifice 22. Therefore, the actual flow rate Qr can be calculated based on the differential pressure ΔP. FIG. 21 shows the relation between the differential pressure ΔP and the actual purge flow rate Qr.

In Steps S353 and S354, like Steps S303 and 304 in the first embodiment, the intake pipe pressure P0 is detected (Step S353) and the reference flow rate Q100 is calculated based on the detected intake pipe pressure P0 (Step S354).

Step S355 is a processing performed by another fuel vapor concentration calculating means, in which the fuel vapor concentration C is calculated based on the actual purge flow rate Qr and the reference flow rate Q100 and in accordance with Equation (14). In Equation (14), "A" is a constant of the same meaning as "A" in the Equation (5).

$$C=(1/A)\times(1-Qr/Q100) \quad (14)$$

In Step S356, the purged fuel vapor flow rate F is calculated in accordance with Equation (15).

$$F=Qr\times C \quad (15)$$

In Step S357, the purged fuel vapor flow rate F is compared with the allowable-purged-fuel-vapor-flow-rate value Fm and it is determined whether F≦Fm or not. When the answer is affirmative, the processing flow advances to Step S358, in which the purge valve opening "x" is made 100%. This is because there is a margin up to the allowable-purged-fuel-vapor-flow-rate value Fm even when the purge valve opening "x", is made 100%. When the answer in Step S357 for determining whether F≦Fm or not is negative, it is determined that at the purge valve opening "x" of 100% it is impossible to properly control the air-fuel ratio due to surplus fuel vapor, and the processing flow shifts to Step S359, in which the purge valve opening "x" is set at (Fm/F)×100%. This is because under the condition of F>Fm the maximum purge flow rate which guarantees the proper air-fuel ratio control becomes the allowable-purged-fuel-vapor-flow-rate value Fm.

After the execution of Step S358 or S359, the purge valve opening "x" is controlled in Step S360 to the degree of opening set in Step S358 or S359.

In Step S361, like Step S311 in the first embodiment, it is determined whether the purge stop condition exists or not. When the answer in Step S361 is negative, the processing flow shifts to Step S351, in which the purged fuel vapor flow rate F and the allowable-purged-fuel-vapor-flow-rate value Fm are updated under new operating conditions and the degree of opening of the purge valve 16 is adjusted (Steps S351 to S360). When the answer in Step S361 for determining whether the purge stop condition exists or not is affirmative, the processing flow advances to Step S362, in which the purge valve 16 is closed, the first switching valve 31 is turned OFF, and the bypass opening/closing valve 28 is closed.

Thus, according to this embodiment, even when the fuel vapor concentration C varies during purge, the degree of opening of the purge valve 16 is adjusted accordingly, so that the air-fuel control can be performed in a more appropriate manner.

Third Embodiment

Figure 22:
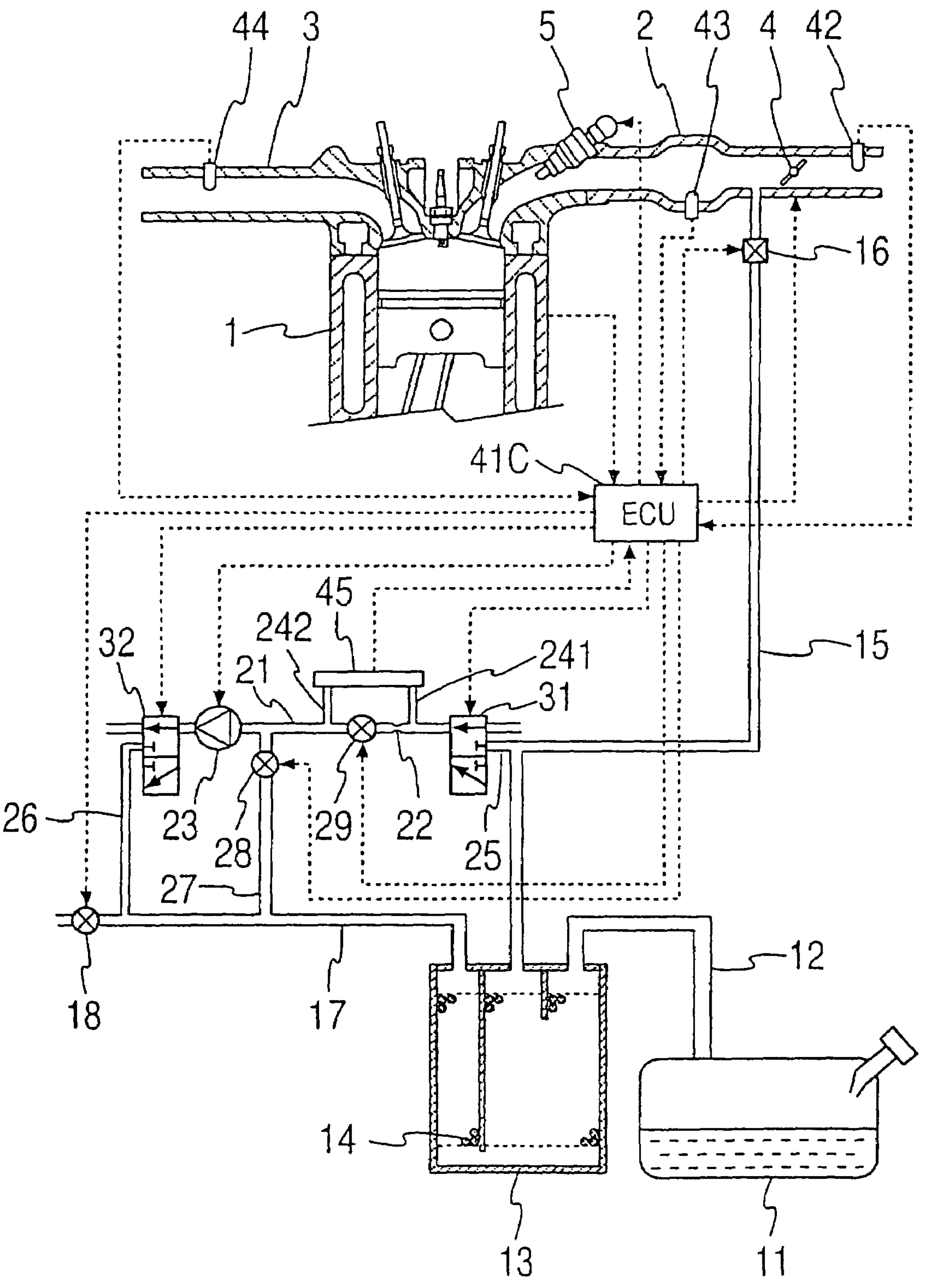
FIG. 22 is a construction diagram of a fuel vapor treatment system for an internal combustion engine according to a third embodiment of the present invention.

FIG. 22 shows the construction of an engine according to a third embodiment of the present invention. In the same figure, a combination ("evaporative system" hereinafter) of structural members located in the range from the canister 13 up to the fuel tank 11 via the inlet passage 12 and up to the purge valve 16 via the purging passage 15 forms a closed space capable of diffusing fuel vapor when the purge valve 16 is closed. According to the associated regulation in the U.S., the installation of a troubleshooting device is obliged for checking whether fuel vapor is leaking or not in the evaporative system ("leak check" hereinafter). This embodiment corresponds to a replacement of a part of the second embodiment by another construction so that the leak check can be done in a simple manner. Portions which perform substantially the same operations as in the previous embodiments are identified by the same reference numerals as in the previous embodiments and a description will be given below mainly about the difference from the previous embodiments.

A fuel vapor passage opening/closing valve 29 is disposed in the fuel vapor passage 21 on the orifice 22 side rather than the connection with the pressure conduit 242. The fuel vapor passage opening/closing valve 29 is an electromagnetic valve, which is controlled so as to open or close the fuel vapor passage 21 by means of ECU 41C. In this embodiment, leakage in the evaporative system is detected by utilizing the orifice 22 and the differential pressure sensor 45. But the construction of this embodiment is substantially the same as that of the second embodiment, provided the fuel vapor passage opening/closing valve 29 is kept open. The air-fuel ratio can be controlled properly by executing the foregoing concentration detecting routine and purge execution routine.

Figure 23:
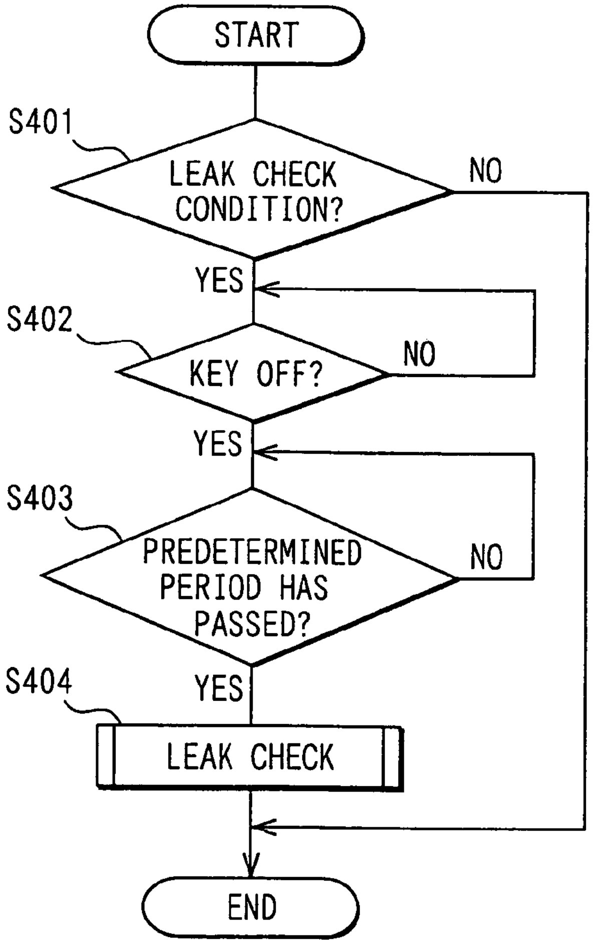
FIG. 23 is a first flow chart showing the operation of the fuel vapor treatment system of the third embodiment.

FIG. 23 shows a troubleshooting control performed by the ECU 41C to check leakage in the evaporative system which is a characteristic portion of this embodiment. In Step S401, it is determined whether a leak check-execution condition exists or not. It is assumed that the leak check execution condition exists when the vehicle operation time continues for a predetermined certain period of time or longer or when the outside air temperature is a predetermined certain level or higher. According to the OBD Regulation in the U.S., the leak check execution condition is established when the following conditions are satisfied. The vehicle should operate 600 seconds or longer at an atmospheric temperature of 20° F. or higher and at lower than 8000 feet above the sea level, driving at 25 miles or more per hour should be for 300 seconds or longer cumulatively, and idling for consecutive 30 seconds or longer should be included. When the answer in Step S401 is negative, this flow is ended, while when the answer in Step S401 is affirmative, it is determined in Step S402 whether the key is OFF or not. When the answer in Step S402 is negative, the processing of Step S402 is repeated, waiting for turning OFF of the key.

When the answer in Step S402 for determining whether the key is OFF or not is affirmative, the processing flow advances to Step S403, in which it is determined whether a predetermined time has elapsed or not from the time when the key turned OFF. The process of Step S403 is for stopping the execution of leak check taking into account the point that, just after turning OFF of the key, the state of the evaporative system is unstable and not suitable for the execution of leak check, for example, the fuel present within the fuel tank 11 oscillates or the fuel temperature is unstable. The predetermined time is a reference time required until the state of the evaporative system becomes stable to such an extent as permits an accurate execution of leak check after the unstable state just after turning OFF of the key. When the answer in Step S403 for determining whether the predetermined time has elapsed or not after turning OFF of the key is negative, the processing of Step S403 is repeated, while when the predetermined time has elapsed, that is, when the answer in Step S403 is affirmative, leak check is carried out in Step S404 and this flow is ended.

Figure 24:
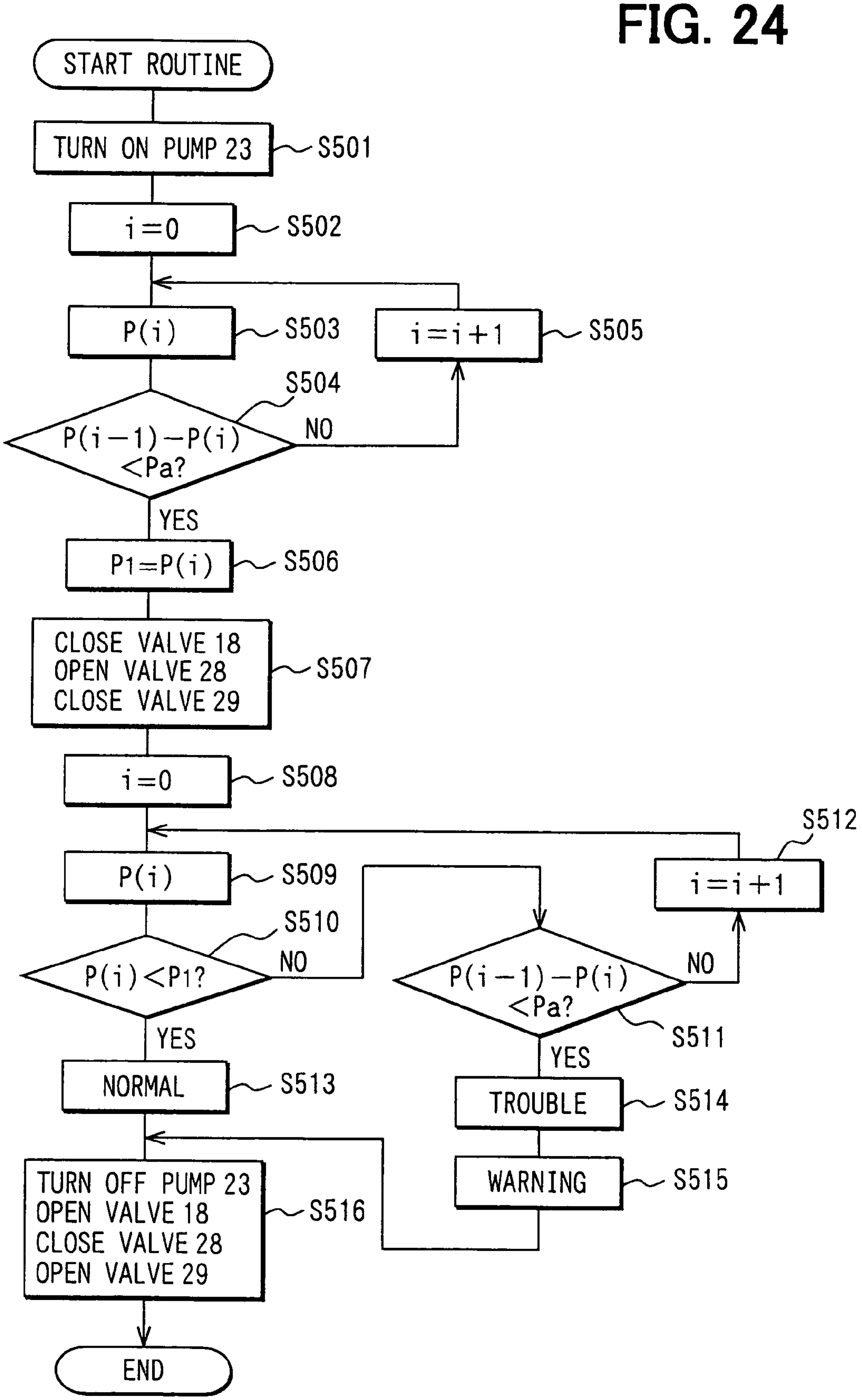
FIG. 24 is a second flow chart showing the operation of the fuel vapor treatment system of the third embodiment.
Figure 25:
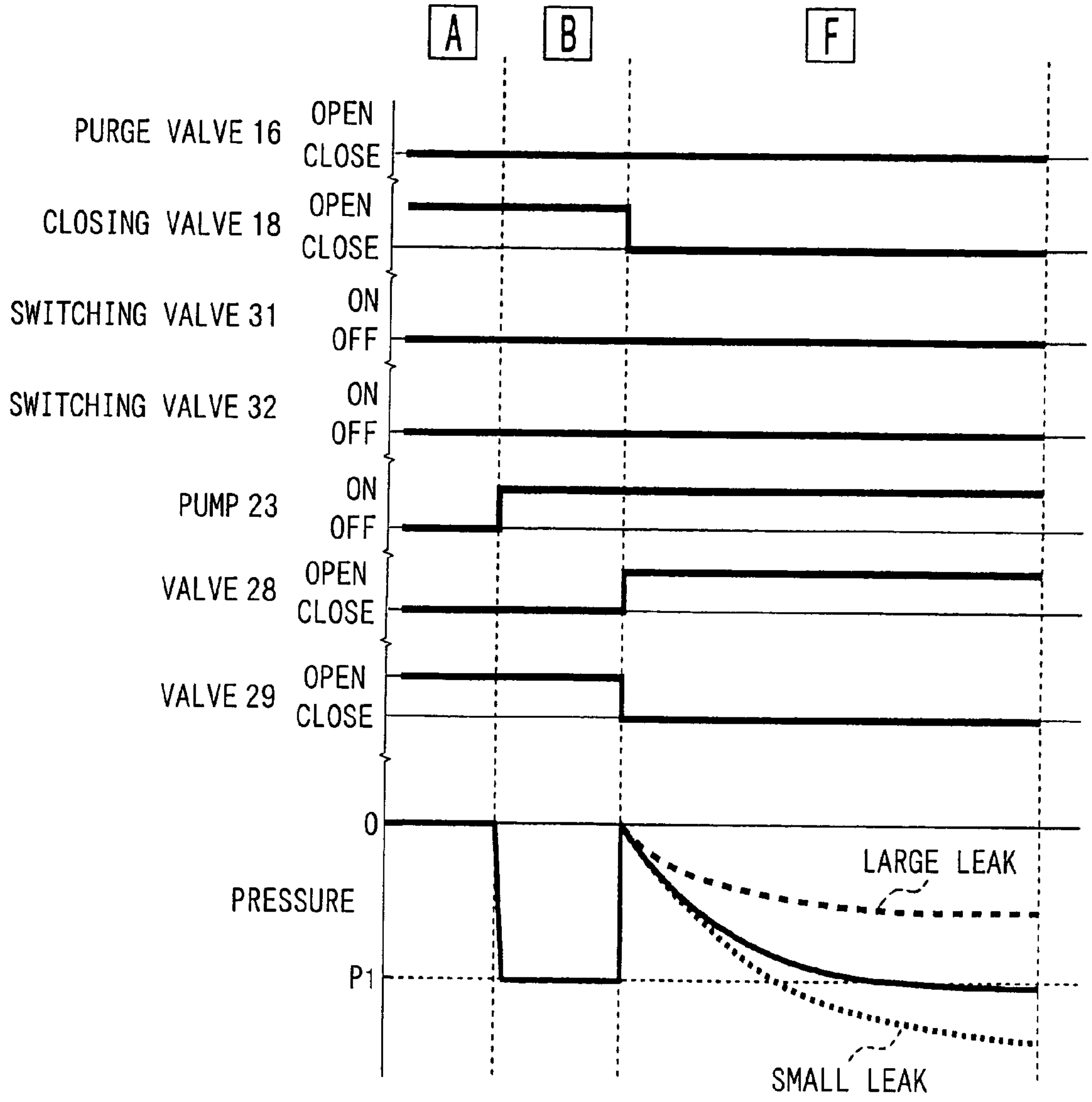
FIG. 25 is a timing chart showing the operation of the fuel vapor treatment system of the third embodiment.

FIG. 24 shows a leak check execution routine and FIG. 25 shows changes in state of various components of the system. In the leak check execution routine, the state of execution corresponds to the state A and this routine is executed with the first switching valve 31 OFF. Therefore, on the pump 23 side rather than the orifice 22 the differential pressure sensor 45 detects the internal pressure of the fuel vapor passage 21 with the atmosphere as a reference. This pressure corresponds to the pressure in FIG. 25.

In Step S501, the pump 23 is turned ON (B in FIG. 25). The state of gas flow at this time is equivalent to the state of FIG. 5, in which air flows through the fuel vapor passage 21 and is again discharged into the atmosphere (the first leak measurement state). The internal pressure of the fuel vapor passage 21 becomes negative at a position between the orifice 22 and the pump 23. In Step S502, a variable i is made equal to zero. In Step S503, pressure P(i) is measured.

In Step S504, a change $P(i-1)-P(i)$ from an immediately preceding measured pressure $P(i-1)$ to this-time measured pressure P(i) is compared with a threshold value Pa to determine whether $P(i-1)-P(i)<Pa$ or not. When the answer is negative, the variable i is incremented in Step S505 and the processing flow returns to Step S503. When the answer in Step S504 for determining whether $P(i-1)-P(i)<Pa$ or not is affirmative, the processing flow advances to Step S506. That is, the measured pressure changes sharply upon activation of the pump 23 and thereafter converges gradually to a pressure value which is defined by for example the sectional area of the passage in the orifice 22. Since the measured pressure exhibits such a behavior, the processes of Step S506 and subsequent steps are executed after the measured pressure converges to a sufficient extent.

In Step S506, P(i) is substituted into the reference pressure P1. Then, in Step S507, the closing valve 18 is closed, the bypass opening/closing valve 28 is opened, and the fuel vapor passage opening/closing valve 29 is closed (F in FIG. 25).

Figure 26:
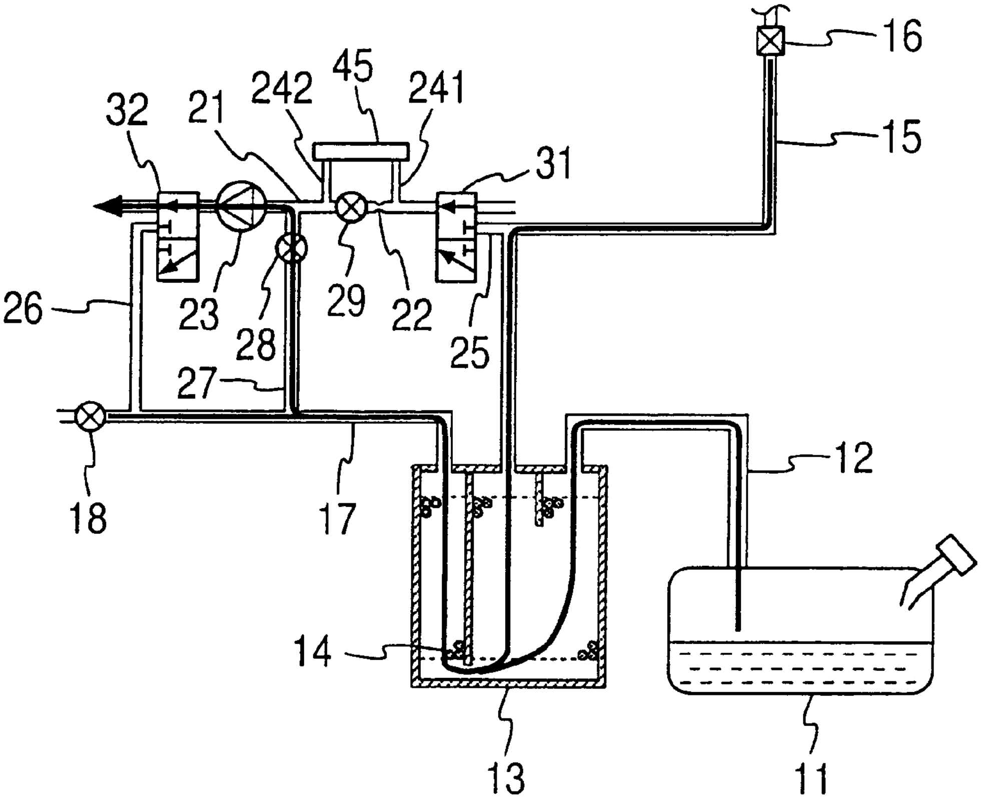
FIG. 26 is a diagram showing the flow of gas in principal portions of the fuel vapor treatment system of the third embodiment.

At this time, the gas present in the fuel tank 11, inlet passage 12, canister 13, purging passage 15 and purged air passage 17 is discharged to the atmosphere as indicated by arrow in FIG. 26, whereby the pressure of the evaporator system is reduced (second leak measurement state). At this time, an arrival pressure as a converged pressure of the measured pressure is defined by the area of a leak hole in the evaporative system and therefore it can be said that the leak hole in the evaporative system is larger than the sectional area of the passage in the orifice 22 unless the arrival pressure does not reach the reference pressure P1. Steps S508 to S515 are concerned with a processing for determining whether a leak trouble is present or not in the evaporative system which processing is performed by comparing the measured pressure with the reference pressure P1. In Step S508, the variable "i" is made equal to zero. In Step S509, the pressure P(i) is measured, then in Step S510, the measured pressure P(i) is compared with the reference pressure P1 to determine whether P(i)<P1 or not. When the answer is affirmative, the processing flow advances to Step S513. In an early stage after the start of suction in the evaporative system, the measured pressure P(i) usually does not reach the reference pressure P1 and the answer in Step S510 is negative.

When the answer in Step S510 for determining whether P(i)<P1 is negative, the processing flow shifts to Step S511. The processes of Steps S511 and S512 are of the same contents as Steps S504 and S505. In Step S511, a change P(i−1)−P(i) from an immediately preceding measured pressure P(i−1) to this-time measured pressure P(i) is compared with the threshold value Pa to determine whether P(i−1)−P(i)<Pa or not. When the answer is negative, the variable i is incremented in Step S512 and the processing flow returns to Step S509. When the answer in Step S511 for determining whether P(i−1)−P(i)<Pa or not is affirmative, the processing flow advances to Step S514. Step S511, like Step S504, waits for convergence of the measured pressure P(i).

In Step S513 the evaporative system is determined to be normal with respect to leakage, while in Step S514 it is determined that a trouble, i.e., leakage, is occurring in the evaporative system. Thus, the normal condition is determined when the measured pressure P(i) has reached the reference pressure P1, while when the measured pressure P(i) has not reached the reference pressure P1, the occurrence of a trouble is determined on condition that the measured pressure P(i) is converged. This determination is based on the sectional area of the passage in the orifice.

The orifice 22 is set taking into account the area of a leak hole leading to the determination indicating the occurrence of a trouble.

After the normal condition is determined in Step S513, the processing flow advances to Step S516. On the other hand, after the occurrence of a trouble is determined in Step S514, the processing flow advances to Step S515, in which warning means is operated, and then the flow advances to Step S516. For example, the warning means is an indicator installed in the vehicular instrument panel.

In Step S516, the pump 23 is turned OFF, the closing valve 18 is opened, the opening/closing valve 28 is closed, the fuel vapor passage opening/closing valve 29 is opened, and this flow is ended.

Thus, according to this embodiment, leak check for the evaporative system can be done by utilizing the orifice 22 for fuel vapor concentration measurement, the pump 23, and the differential pressure sensor 45. The fuel vapor treatment system can be provided at low cost because it is not necessary to provide new sensors.

Figure 27:
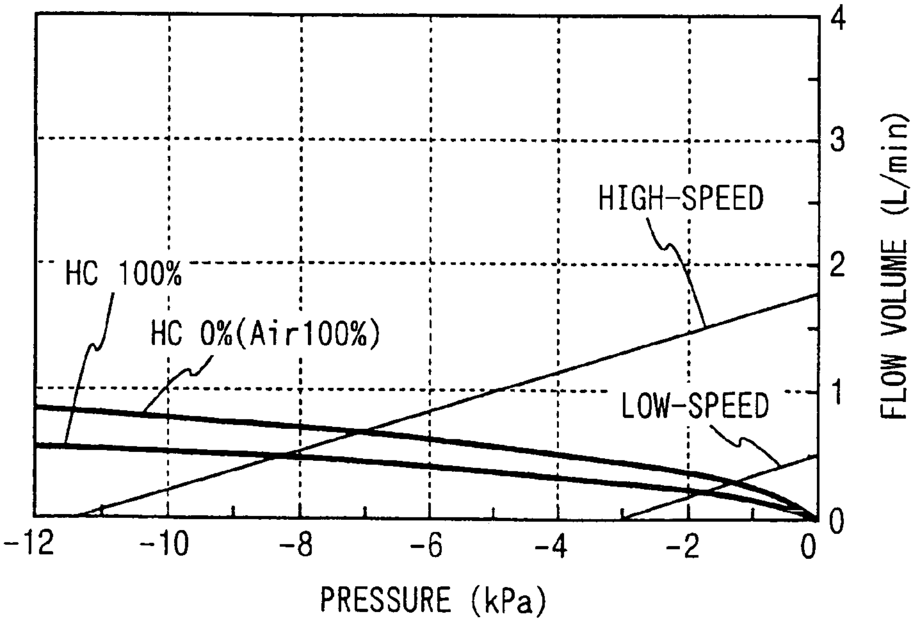
FIG. 27 is a first graph explaining a modification of the fuel vapor treatment system of the third embodiment.
Figure 28:
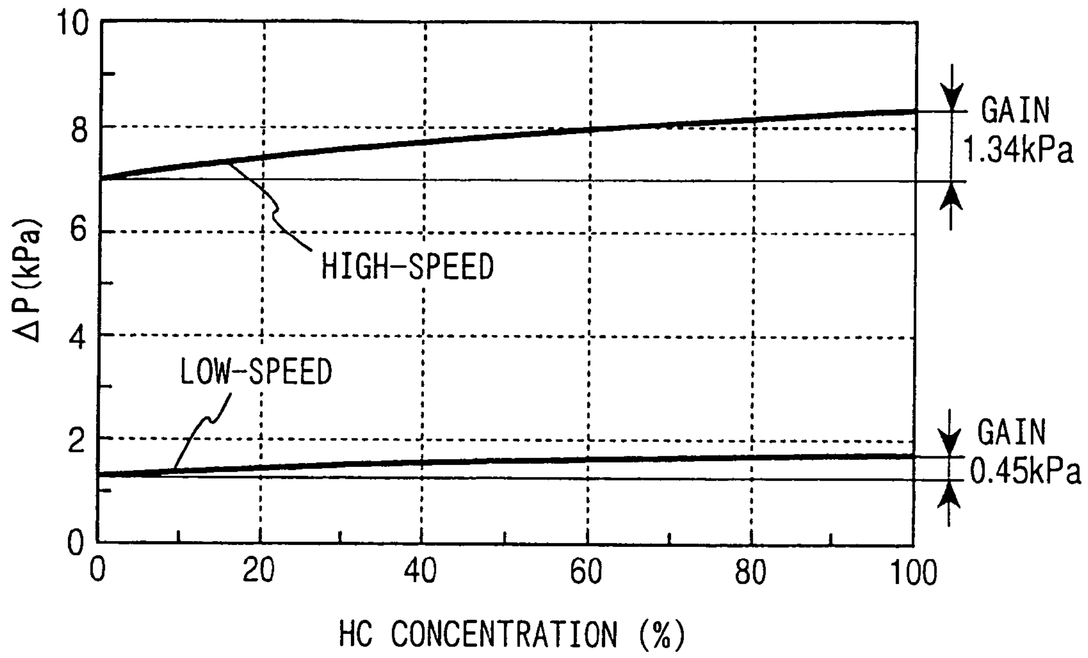
FIG. 28 is a second graph explaining the modification of the fuel vapor treatment system of the third embodiment.

The capacity of the pump 23 may be switched from one to the other between the time when the fuel vapor concentration is to be measured and the time when leakage in the evaporative system is to be checked. Switching of the pump capacity can be done by increasing or decreasing the number of revolutions of the pump 23. FIGS. 27 and 28 show pump characteristics and the relation between fuel vapor concentration (HC concentration in the figures) and ΔP in case of changing the number of revolutions of the pump.

As noted earlier, the detected differential pressure ΔP is obtained from a point of intersection between pump characteristic and orifice characteristic. In this connection, when the number of revolutions of the pump 23 is set high to increase the flow rate relatively, the difference in fuel vapor concentration is reflected largely in the detected differential pressure ΔP (FIG. 27). That is, by making the number of revolutions of the pump 23 high, it is possible to ensure a large detection gain (FIG. 24). On the other hand, the higher the number of revolutions of the pump 23, the lower the pressure of the evaporative system at the time of leak check. When the difference in pressure between the inside and the outside of the fuel tank 11 becomes too large at the time of leak check, a considerable strength is required of the fuel tank 11 which is formed by molding from resin. This is not desirable. In view of this point, by making the number of revolutions of the pump 23 small during leak check, a excessively high strength is not required of the fuel tank 11.

Fourth Embodiment

Figure 29:
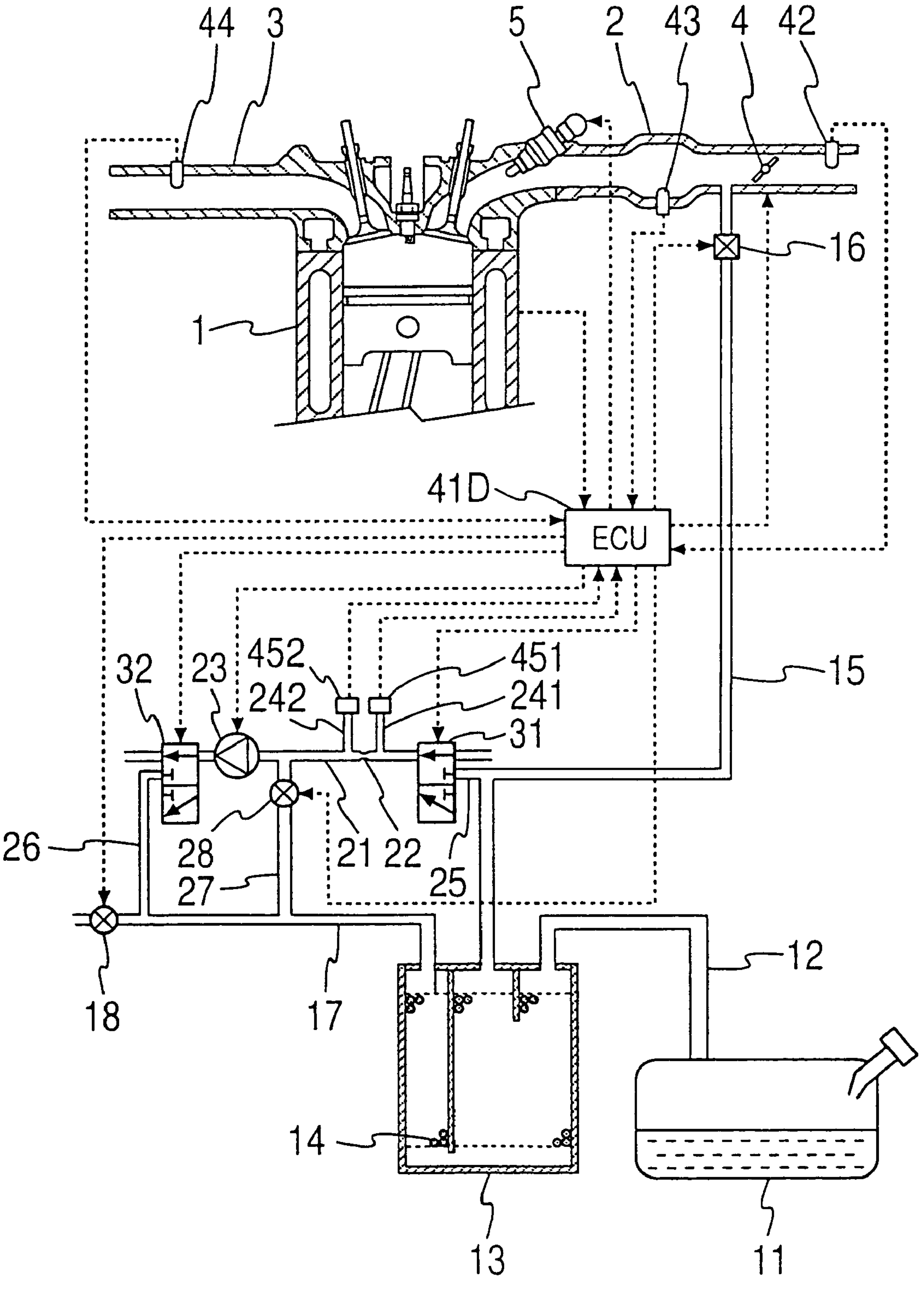
FIG. 29 is a construction diagram of a fuel vapor treatment system for an internal combustion engine according to a fourth embodiment of the present invention.

FIG. 29 shows the construction of an engine according to a fourth embodiment of the present invention. In this fourth embodiment, a part of the construction of the third embodiment is modified to check leakage in the evaporative system as in the third embodiment. Portions which perform substantially the same operations as in the previous embodiments are identified by the same reference numerals as in the previous embodiments, and a description will be given below mainly about the difference from the previous embodiments.

A differential pressure in the orifice 22 is calculated by ECU 41D from pressures detected by pressure sensors 451 and 452. The fuel vapor passage opening/closing valve 29 is not installed.

Figure 30:
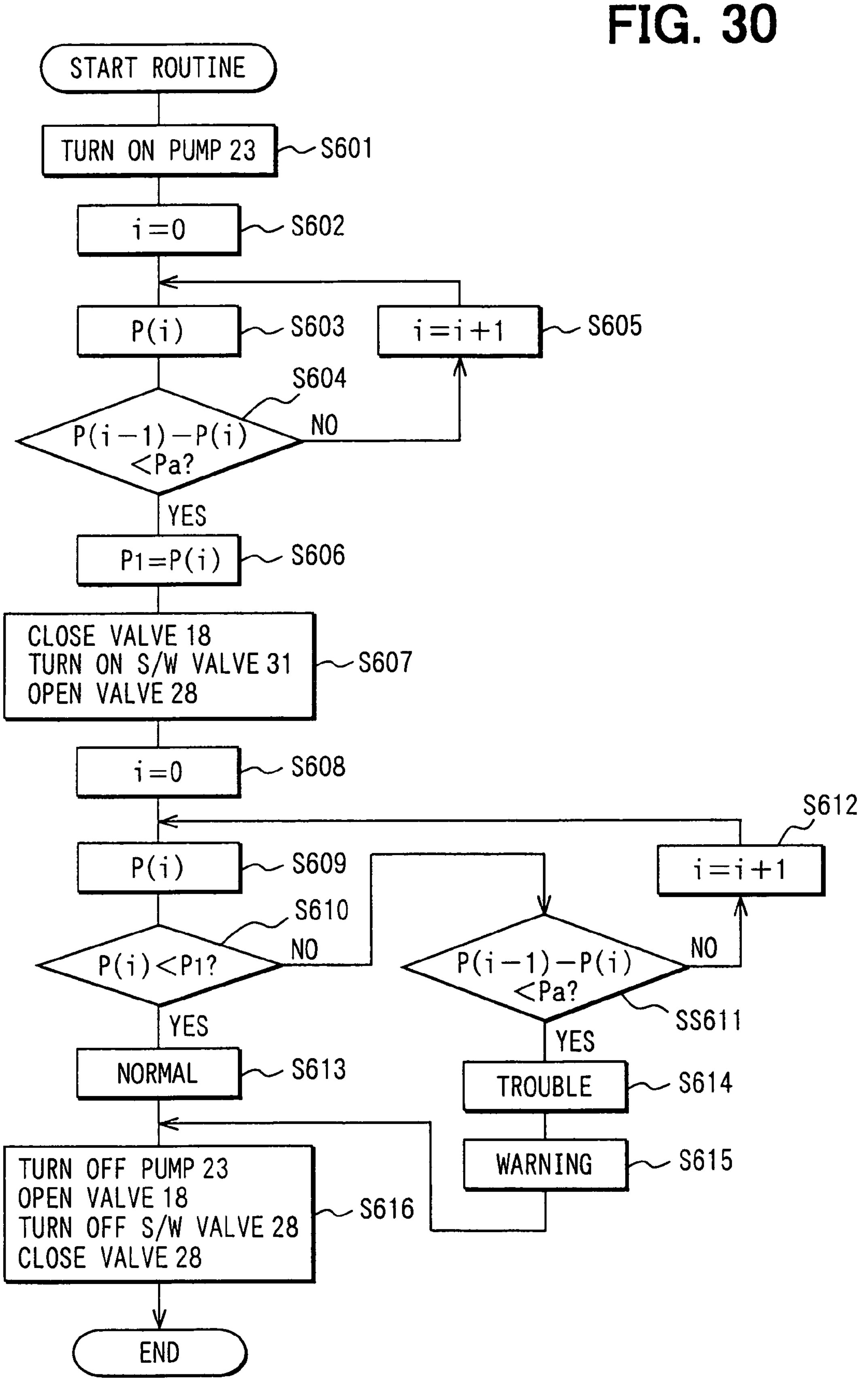
FIG. 30 is a flow chart showing the operation of the fuel vapor treatment system of the fourth embodiment.
Figure 31:
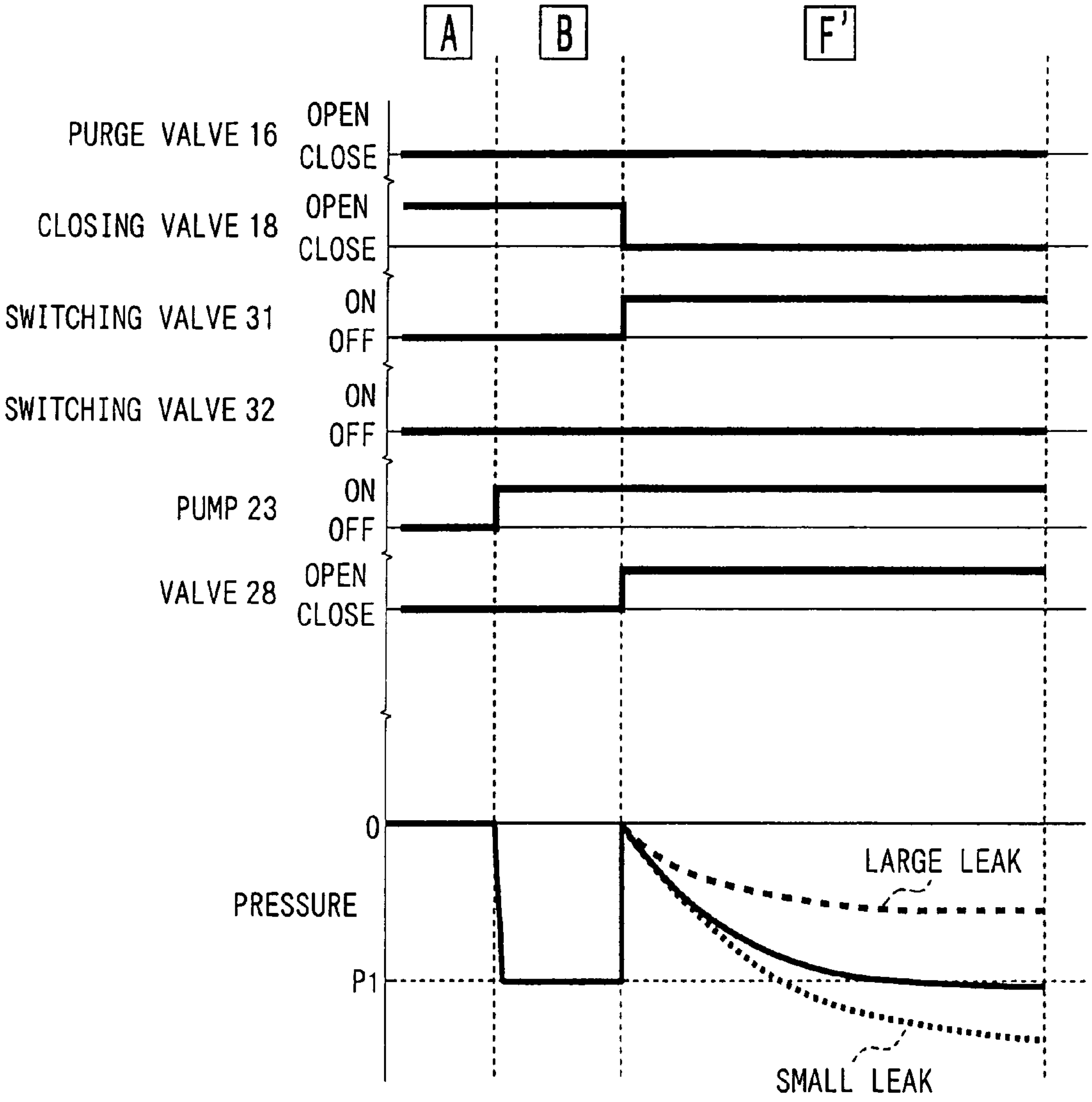
FIG. 31 is a timing chart showing the operation of the fuel vapor treatment system of the fourth embodiment.

The ECU 41D is basically the same as ECU 41A (FIG. 15). FIG. 30 shows a leak check execution routine performed by ECU 41D and FIG. 31 shows changes in state of various components of the fuel vapor treatment system. In Steps S601 to S606, like Steps S501 to S506 in the third embodiment, the pump 23 is turned ON to let air flow through the fuel vapor passage 21, then pressure P(i) is detected by the pressure sensor 452, and P1 is set equal to P(i) when the relation of P(i−1)−P(i)<Pa is obtained.

Figure 32:
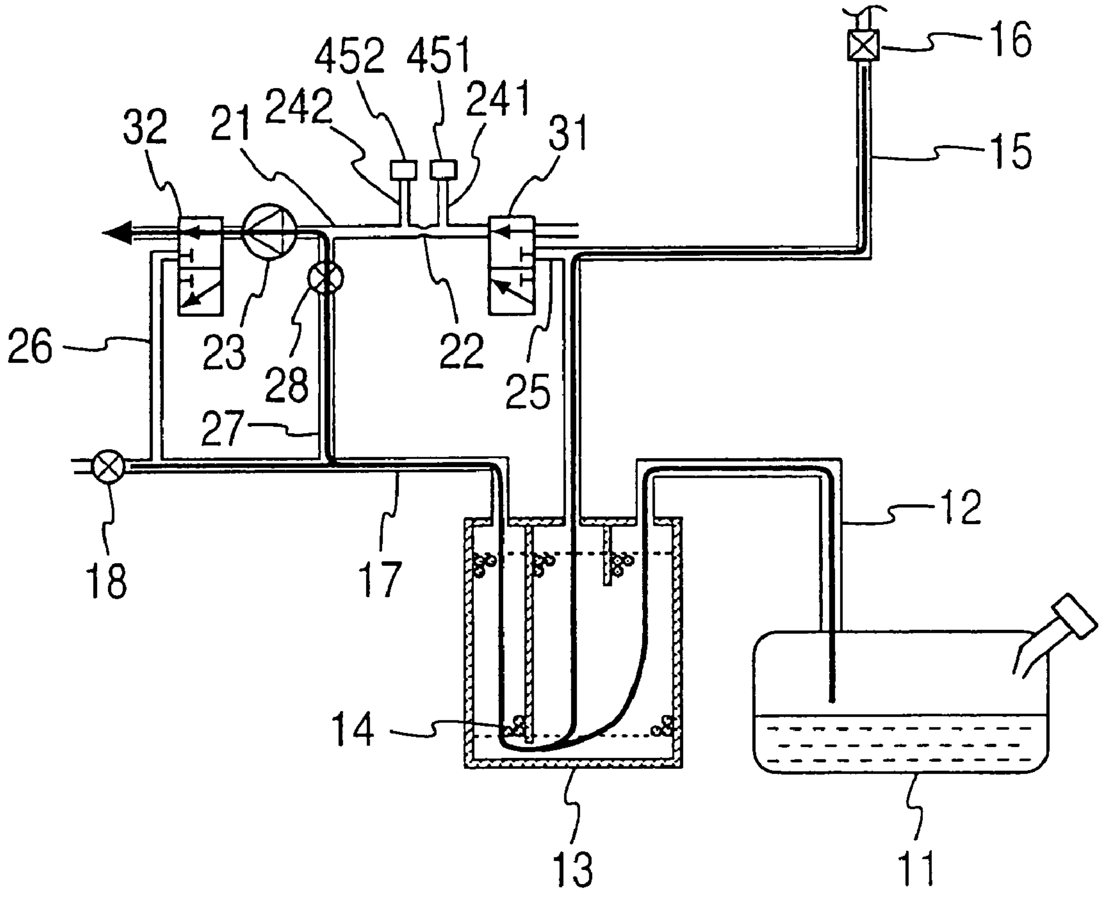
FIG. 32 is a diagram showing the flow of gas in principal portions of the fuel vapor treatment system of the fourth embodiment.

In Step S607, the closing valve 18 is closed, the first switching valve 31 is turned ON, and the bypass opening/closing valve 28 is opened. Pressure which is converged in this state is measured by the pressure sensor 452. Although gas flows in this state as shown in FIG. 32, this point is different from the third embodiment in that gas can flow through the orifice 22. In Step S608 to S615, like Steps S508 to S515 in the third embodiment, the normal condition is determined when P1<P(i), while when P1≧P(i) remains as it is and P(i) converges to P(i−1)−P(i)<Pa, it is determined that a trouble is occurring and the warning means is operated.

In Step S616, the pump 23 is turned OFF, the closing valve 18 is opened, the first switching valve 31 is closed, and the bypass valve 28 is closed.

Thus, the evaporative system and the orifice 22 are brought into communication with each other by turning ON the first switching valve 31. Therefore, by detecting the pressure of the to-be-inspected space with use of not a differential pressure sensor but a pressure sensor, it is not required to provide a valve for shutting off the fuel vapor passage 21 on the orifice 22 side rather than the connection with the pressure conduit 242. As a result, the construction can be further simplified.

Figure 33:
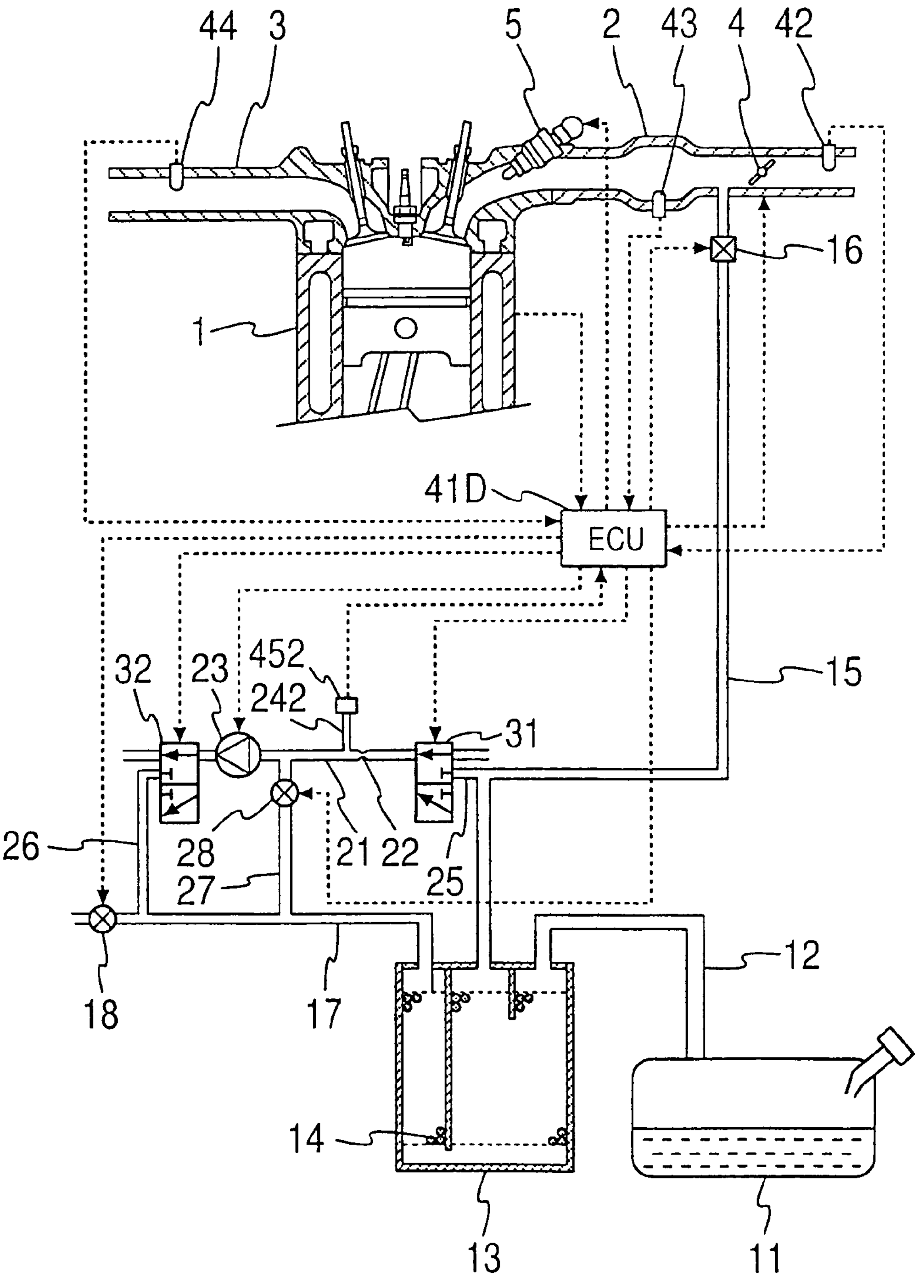
FIG. 33 is a construction diagram showing a modification of the fuel vapor treatment system of the fourth embodiment.

The pressure sensor 451 need not be provided as in FIG. 33. In this case, the pressure detected by the pressure sensor 452 is regarded as the pressure detected by the pressure sensor 451 in FIG. 29 prior to operation of the pump 23. As a result, it is possible to attain a still further simplification of the construction.

The leak check for the evaporative system is carried out by measuring pressures in pressure reduction ranges in two leak measurement states. In this case, combinations of pressure reduction ranges in the two leak measurement states are as in the third and fourth embodiment wherein one pressure reduction range is only the fuel vapor passage having the orifice or as in the fourth embodiment wherein the orifice is integral with the evaporative system and is not open to the atmosphere on the side opposite to the pump.

Unlike these modes, there may be adopted a mode wherein not only the pressure of the evaporative system is reduced by the pump but also the pressure reduction is performed in an open condition to the atmosphere of the orifice-including fuel vapor passage on the side opposite to the pump. In this case, the detected pressure value depends on the total value of both the sectional area of the passage in the orifice and the sectional area of the passage in the leak hole of the evaporative system. Therefore, by comparing this pressure value with the pressure value in case of the pressure reduction range being the orifice alone or in case of the pressure reduction range being the evaporative system alone, it is possible to determine the size of the leak hole. Further, not the reduction of pressure by the pump, but the application of pressure may be adopted.

Figure 34:
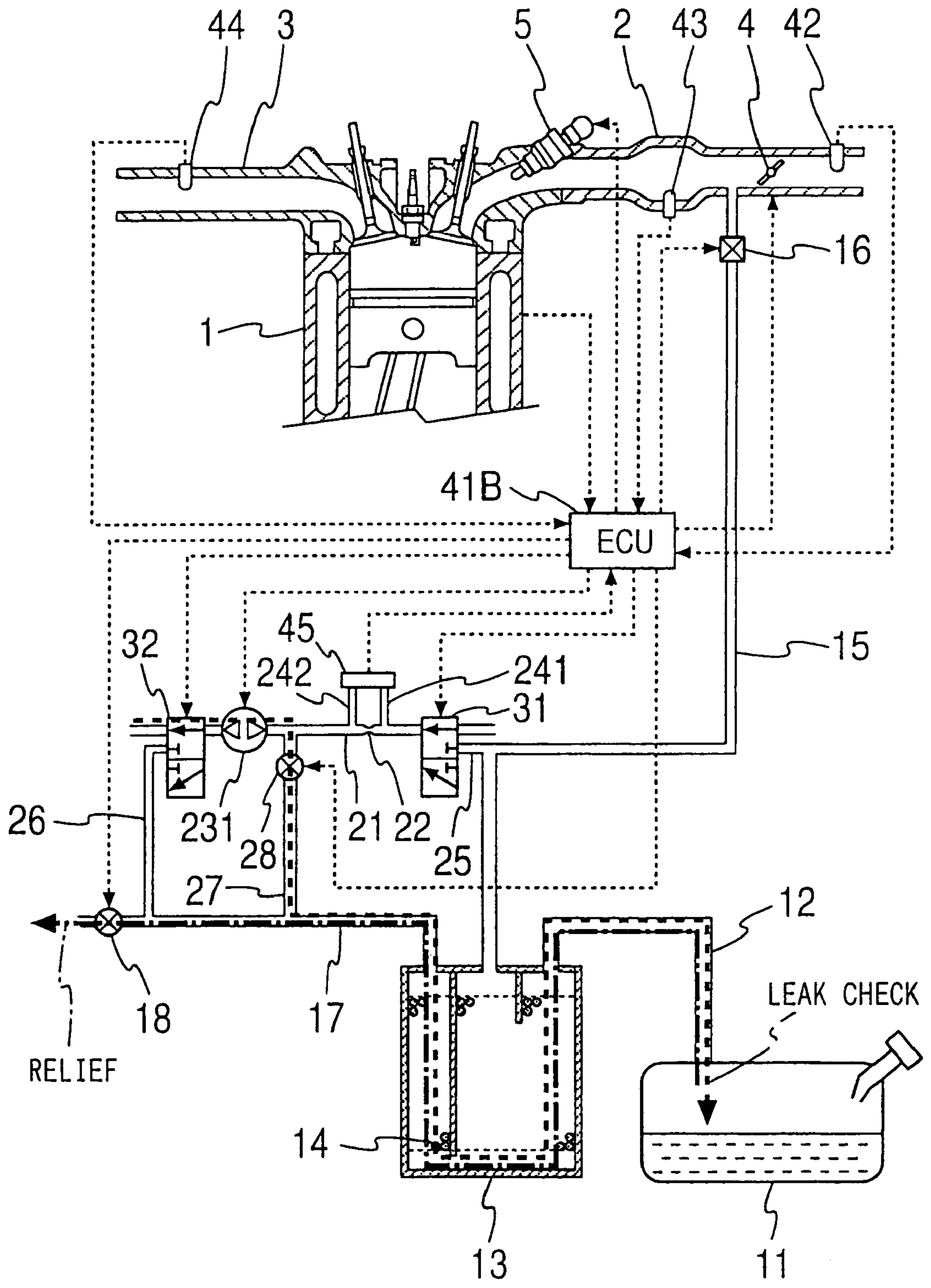
FIG. 34 is a construction diagram showing another modification of the fuel vapor treatment system of the fourth embodiment.

FIG. 34 shows an example of a pressure application type leak check, in which a part of the construction of the second embodiment is modified so as to perform leak check for the evaporative system by the application of pressure.

A pump 231 is an electric pump capable of rotating forward and reverse. The measurement of the fuel vapor concentration is performed in the same way as in the second embodiment while setting the rotational direction of the pump 231 in a direction (the rotation in this direction will hereinafter be referred to as "forward rotation") in which gas flows from the first switching valve 31 to the second switching valve 32. Leak check for the evaporative system is performed in the same manner as in the third embodiment except that the rotational direction of the pump 231 is set in the opposite direction (the rotation in this direction will hereinafter be referred to as "reverse rotation"). In this way it is possible to apply pressure in the pressure application range instead of pressure reduction. That is, when the pump 231 is turned ON with the first and second switching valves 31, 32 OFF and the opening/closing valve 28 closed, air is introduced into the fuel vapor passage 21 and the outflow of gas is restricted by the orifice 22, so that the internal pressure of the fuel vapor passage 21 rises (first leak measurement state). Next, when the first switching valve 31 is turned ON and the opening/closing valve 28 is opened, an air is introduced along the path indicated by a dotted line in FIG. 34 from the pump 231 through the bypass 27 and purged air passage 17, whereby the evaporative system is pressurized (second leak measurement state). By comparing pressure values detected in these two states it is possible to perform the leak check.

In the pressure application type leak check, however, "internal pressure relief" is needed to restore the internal pressure of the tank to the atmospheric pressure after the end of leak check. At the time of internal pressure relief, when the canister 13 is in a state of adsorption close to breakthrough, HC adsorbed in the canister is desorbed by the internal pressure relief, with consequent fear of entry of HC into the pump. Particularly, in case of using a pump (e.g., vane pump) of a structure involving internal leak, as a result of entry of breakthrough HC into the pump from a pressure application line, the P-Q characteristic of the pump varies and there is a fear that an erroneous concentration may be detected at the time of detecting concentration just after the leak check (e.g., detecting concentration after start-up of the engine). As a countermeasure, according to the construction shown in FIG. 34, the opening/closing valve 28 disposed in the bypass 27 which provides communication between the purged air passage 17 as a main atmosphere line and the pump 231 is closed at the time of internal pressure relief. Subsequently, the closing valve 18 is opened, whereby gas flows from the purged air passage 17 to the closing valve 18 as shown in the figure and hence it is possible to prevent the entry of HC into the pump 231.

Thus, by disposing the opening/closing valve 28 in the bypass 27 it is possible to cut off communication between the canister 13 and the pump 231. Therefore, even when there is used a pump involving internal leak and the detection of concentration is performed just after the pressure application type leak check, it is possible to suppress variations in pump characteristic and detect an accurate concentration. When purging is performed during vehicular running and after the leak check, there does not occur any variation in characteristic because the pump portion is also scavenged with fresh gas. In the construction of FIG. 34, operations may be performed such that the opening/closing valve 28 is not closed at the time of internal pressure relief, the pump 231 is kept ON (with the evaporative system pressurized), the closing valve 18 is opened, and thereafter the opening/closing valve 28 is closed. Also in this case it is possible to prevent the entry of HC into the pump portion.

Although in the above embodiments the bypass 27 which connects the purged air passage 17 and the fuel vapor passage 21 with each other while bypassing the canister 13 is used as a pressure reducing passage or a pressure application passage at the time of leak check, this does not always constitute a limitation. For example, there may be adopted a construction free of the by pass 27 wherein the pump 23 is rotated forward to pressurize the evaporative system from the branch passage 26 through the purged air passage 17. Also in this case it is possible to prevent breakthrough of HC to the pump 23 by closing the second switching valve 32 which serves as an opening/closing valve during internal pressure relief. Thus, in the present invention, both leak check and concentration detection can be effected easily by utilizing or modifying the existing construction.

In each of the above embodiments, the differential pressure may be determined not by use of a differential pressure sensor or pressure sensors but based on operating conditions the pump 23 such as, for example, drive voltage, drive current, and the number of revolutions. This is because these conditions vary in accordance with the load on the pump. In this case, a voltmeter, an ammeter, and a revolution sensor are provided as means for detecting operating conditions of the pump.

Figure 35:
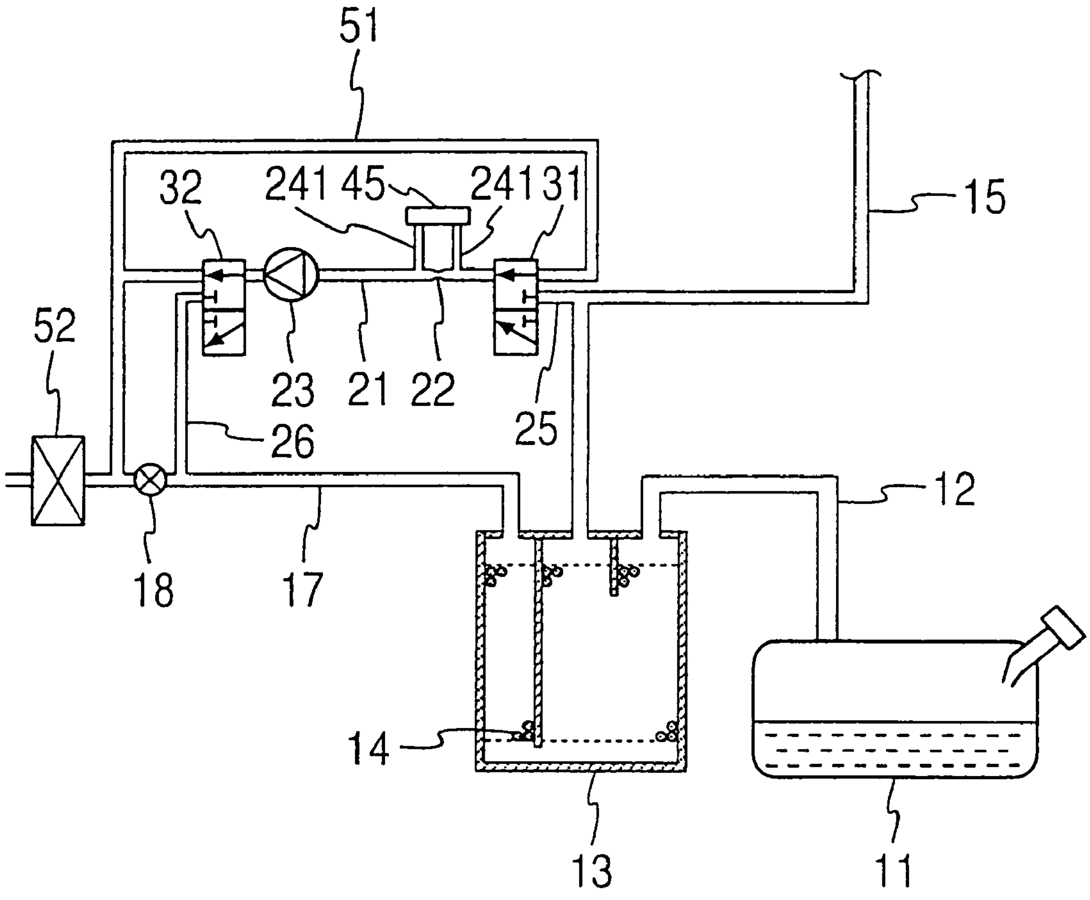
FIG. 35 is a construction diagram showing a further modification of the fuel vapor treatment system of the fourth embodiment.

Although atmosphere-side ports of the first and second switching valves 31, 32 are not shown in the construction diagrams of the above embodiments, those ports are connected to air filters through predetermined pipes. In this connection, there may be adopted such a construction as shown in FIG. 35 in which a single air inlet passage 51 branches from the purged air passage 17 so as to communicate with both atmosphere-side ports of the first and second switching valves 31, 32 and is connected to an air filter 52, and the fuel vapor passage 21 is put in communication with the purged air passage 17 through the air inlet passage 51. Consequently, it is not necessary to lay pipes for each of the switching valves, that is, a compact construction can be attained.

Fifth Embodiment

Figure 36:
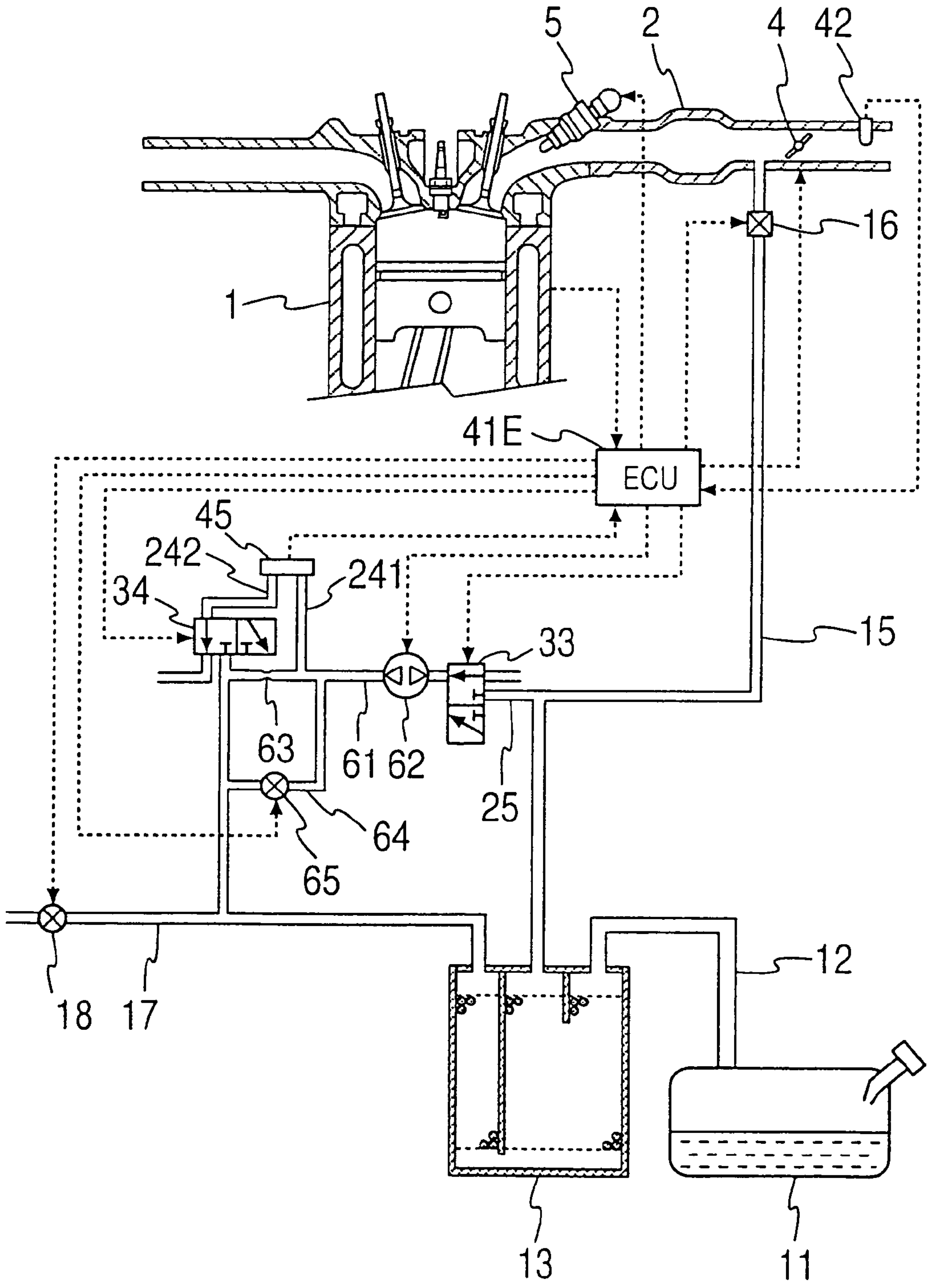
FIG. 36 is a construction diagram of a fuel vapor treatment system for an internal combustion engine according to a fifth embodiment of the present invention.

FIG. 36 shows the construction of an engine according to a fifth embodiment of the present invention. In this fifth embodiment, a part of the construction of the third embodiment is modified so as to perform leak check for the evaporative system as in the third embodiment. Portions which perform substantially the same operations as in the previous embodiments are identified by the same reference numerals as in the previous embodiments and a description will be given below mainly about the difference from the previous embodiments.

A fuel vapor passage 61 can communicate on one end side thereof with the branch passage 25 branching from the purging passage 15 through a switching valve 33 which serves as measurement passage switching means, and is in communication on an opposite end side thereof with the purged air passage 17. The switching valve 33 is an electromagnetic valve of a three-way valve structure adapted to switch between the side where the fuel vapor passage 61 is opened to the atmosphere and the branch passage 25 is closed and the side where the branch passage 25 and the fuel vapor passage 61 are brought into communication with each other.

An orifice 63 and a pump 62 are provided in the fuel vapor passage 61. Pressure conduits 241 and 242 are connected to the fuel vapor passage 61 at both ends of the orifice 63 and a pressure difference before and behind the orifice 63 is detected by the differential pressure sensor 45.

A switching valve 34 is disposed in the pressure conduit 242 located on the purged air passage 17 side to switch the differential pressure sensor 45 from one side to the other between the fuel vapor passage 61 side and the atmosphere opening side. The switching valve 34 is an electromagnetic valve of a three-way valve structure. The switching valves 33 and 34 are controlled by ECU 41E. When the switching valve 34 is switched to the fuel vapor passage 61 side, a detected signal provided from the differential pressure sensor 45 indicates an internal pressure of the fuel vapor passage 61. The pump 62 is an electric pump capable of rotating forward and reverse, whose ON-OFF and switching of rotational direction are controlled by ECU 41E.

A passage 64 bypasses the orifice 63 and an opening/closing valve 65 is disposed in the passage 64. The opening/closing valve is an electromagnetic valve of a two-way valve structure. Also in this embodiment, as in the previous embodiments, the closing valve 18 is provided for opening and closing the purged air passage 17. Four valves are used exclusive of the purge valve 16. Although this number is smaller by one than in the third embodiment, it is possible to effect operations (fuel vapor concentration measurement and leak check for the evaporator system) equal to those in the previous embodiments.

(Measurement of Fuel Vapor Concentration)

First, the opening/closing valve 65 is closed and the closing valve 18 is opened. Then, the switching valve 33 is switched to the atmosphere open side and the switching valve 34 is switched to the fuel vapor passage 61 side. The rotational direction of the pump 62 is switched to the direction in which the discharged gas from the pump 62 flows to the orifice 63 (the rotation in this direction will hereinafter be referred to as "forward rotation"). As a result, air which has entered the fuel vapor passage 61 from one end of the same passage passes through the purged air passage 17 and is again discharged to the atmosphere side. This state corresponds to the first concentration measurement state in each of the previous embodiments shown in FIG. 5. At this time, a differential pressure detected by the differential pressure sensor 45 is inputted to ECU 41E.

Figure 6:
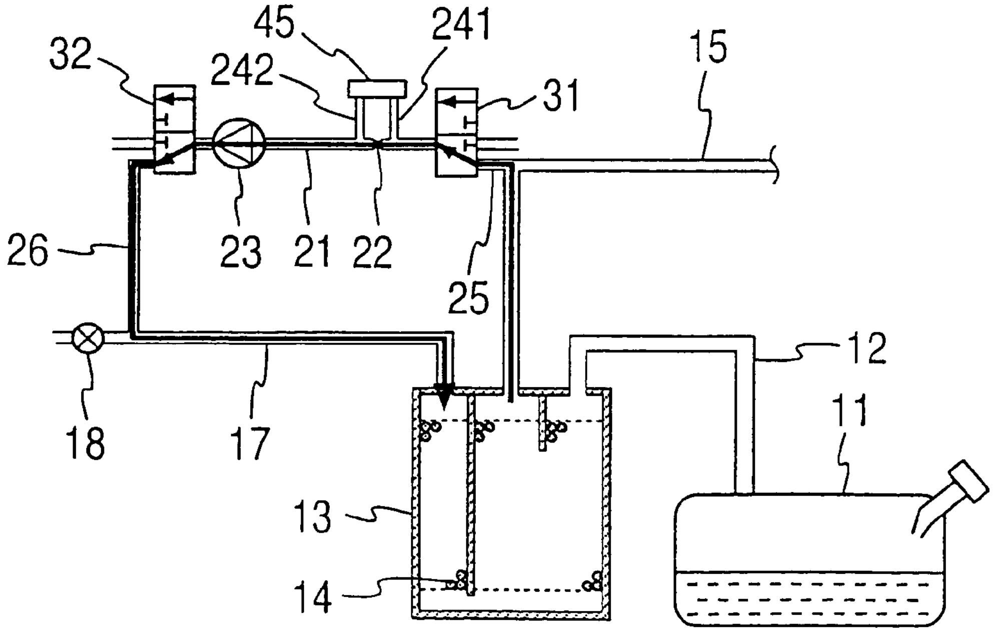
FIG. 6 is a second diagram showing the flow of gas in the principal portions of the fuel vapor treatment system.

Next, the switching valve 33 is switched to the branch passage 25 side and the closing valve 18 is closed. As a result, there is formed a closed annular path along which the fuel vapor-containing air present within the canister 13 passes through the fuel vapor passage 61 from the purging passage 15 and again returns to the canister 13. This state corresponds to the second concentration measurement state in each of the previous embodiments shown in FIG. 6. At this time, a differential pressure detected by the differential pressure sensor 45 is inputted to the ECU 41E.

In the ECU 41E, the fuel vapor concentration is calculated in the same way as in the previous embodiments (see Steps S206 to S208 in FIG. 3) based on the detected differential pressures in the first and second concentration measurement states.

(Leak Check in Evaporative System)

Also in case of leak check for the evaporative system, the opening/closing valve 65 is closed beforehand and the closing valve 18 is opened. Then, the switching valve 33 is switched to the atmosphere open side and the switching valve 34 is switched to the atmosphere open side. The pump 62 is rotated in a direction opposite ("reverse rotation" hereinafter as the case may be) to the rotational direction in the fuel vapor concentration measurement. As a result, the air present within the fuel vapor passage 61 is discharged in a state in which the entry of air is restricted by the orifice 63. This state corresponds to the first leak measurement state in the third embodiment and the pressure detected by the differential pressure sensor 45 is inputted until convergence thereof (see Steps S502 to S506 in FIG. 24).

Next, the closing valve 18 is closed and the opening/closing valve 65 is opened. The pump 62 is reverse-rotated as above. As a result, a closed space from the canister 13 to the purge valve 16 and the switching valve 33 and from the canister 13 to the pump 62 is formed as a to-be-inspected space and an air is discharged by the pump 62. This state corresponds to the second leak measurement state in the third embodiment and the pressure detected by the differential pressure sensor 45 is inputted until convergence thereof. In ECU 41E, based on the detected pressures in the first and second leak measurement states, the presence or absence of leak is determined as the area of a leak hole based on the sectional area of the passage in the orifice 63 which is a reference orifice as in the third embodiment (see Steps S506 to S515).

In the second concentration measurement state, a gas circulating annular path is formed between the fuel vapor passage 61 and the canister 13. When the second leak measurement state is to be obtained on the premise of the said path, it is necessary to not only shut off between the branch passage 25 and the fuel vapor passage 61 by the switching valve 33 but also provide a pipe for connecting the evaporative system to the pump 62, e.g., a pipe for connecting the purged air passage 17 to the fuel vapor passage 61 at a position between the pump 62 and the switching valve 33, and further provide a valve for opening and closing the said pipe [see the bypass 27 and bypass opening/closing valve 28 in the third embodiment (FIG. 22)].

These pipe and valve can be omitted by reversing the rotational direction of the pump 62 to reverse the gas flowing direction. Thus, according to this embodiment, despite a simple construction using a reduced number of valves, the measurement of fuel vapor concentration and leak check for the evaporative system substantially equivalent to those in the third embodiment can be effected.

Sixth Embodiment

Figure 37:
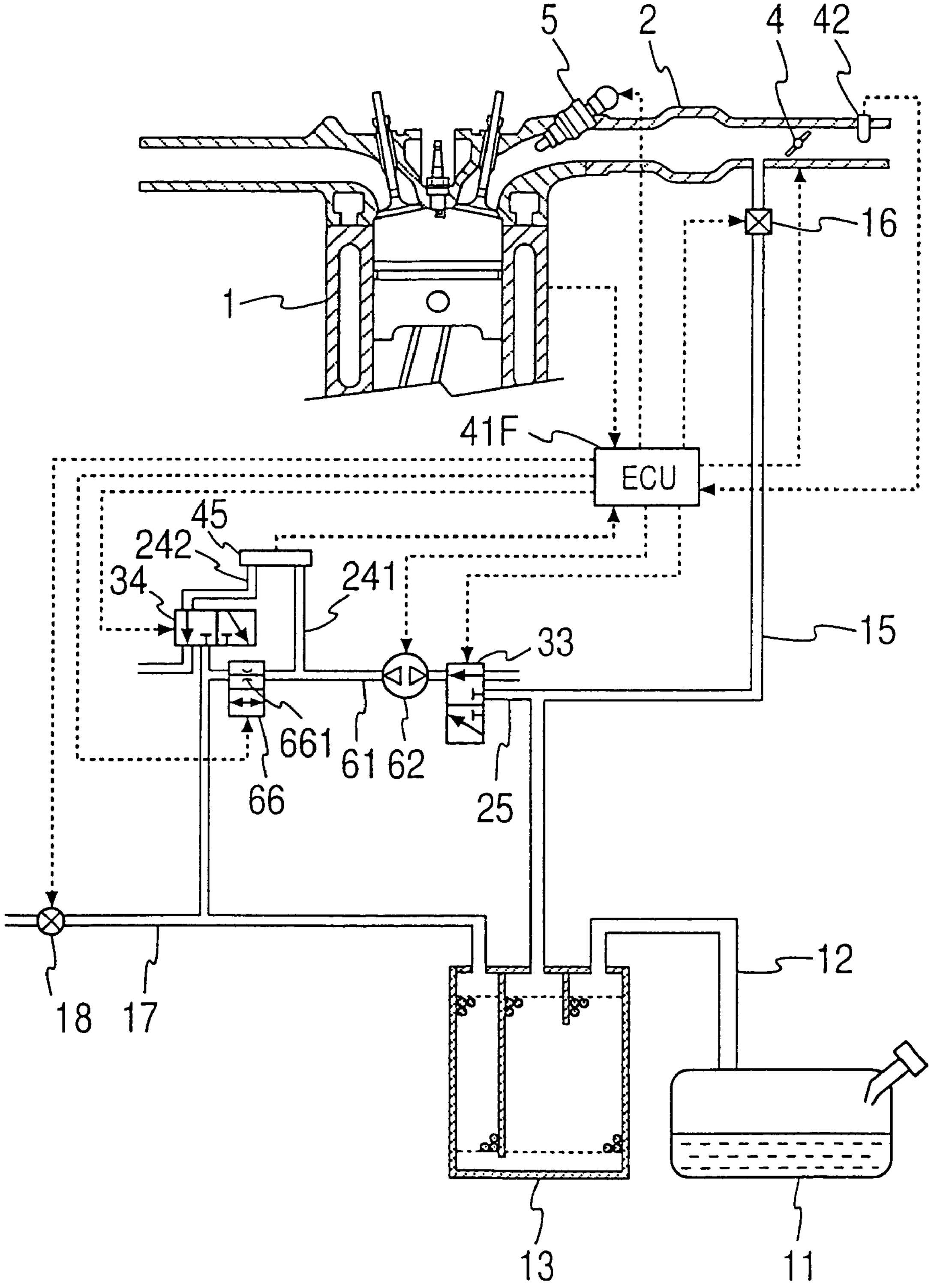
FIG. 37 is a construction diagram of a fuel vapor treatment system for an internal combustion engine according to a sixth embodiment of the present invention.

FIG. 37 shows the construction of an engine according to a sixth embodiment of the present invention. This embodiment corresponds to a replacement of a part of the construction of the fifth embodiment. Portions which performs substantially the same operations as in the previous embodiments are identified by the same reference numerals as in the previous embodiments and a description will be given below mainly about the difference from the previous embodiments.

In this embodiment, a switching valve 66 disposed in the fuel vapor passage 61 is constituted by an electromagnetic valve with orifice. In one switched state, the fuel vapor passage 61 becomes a passage having an orifice 661, while in the other switched states the fuel vapor passage 61 becomes a simple passage free of orifice. The one switched state is equivalent to the closed state of the opening/closing valve 65 in the fifth embodiment, while the other switched state is substantially equivalent to the open condition of the valve 65, whereby the first and second concentration measurement states and the first and second leak measurement states can be realized. Since related passages can be omitted, the construction is further simplified and the layout of pies becomes neat.

ECU 41F controls not only the valves 18, 33 and 34 but also the electromagnetic valve 66 so that the first and second concentration measurement states and the first and second leak measurement states are realized.

Seventh Embodiment

Figure 38:
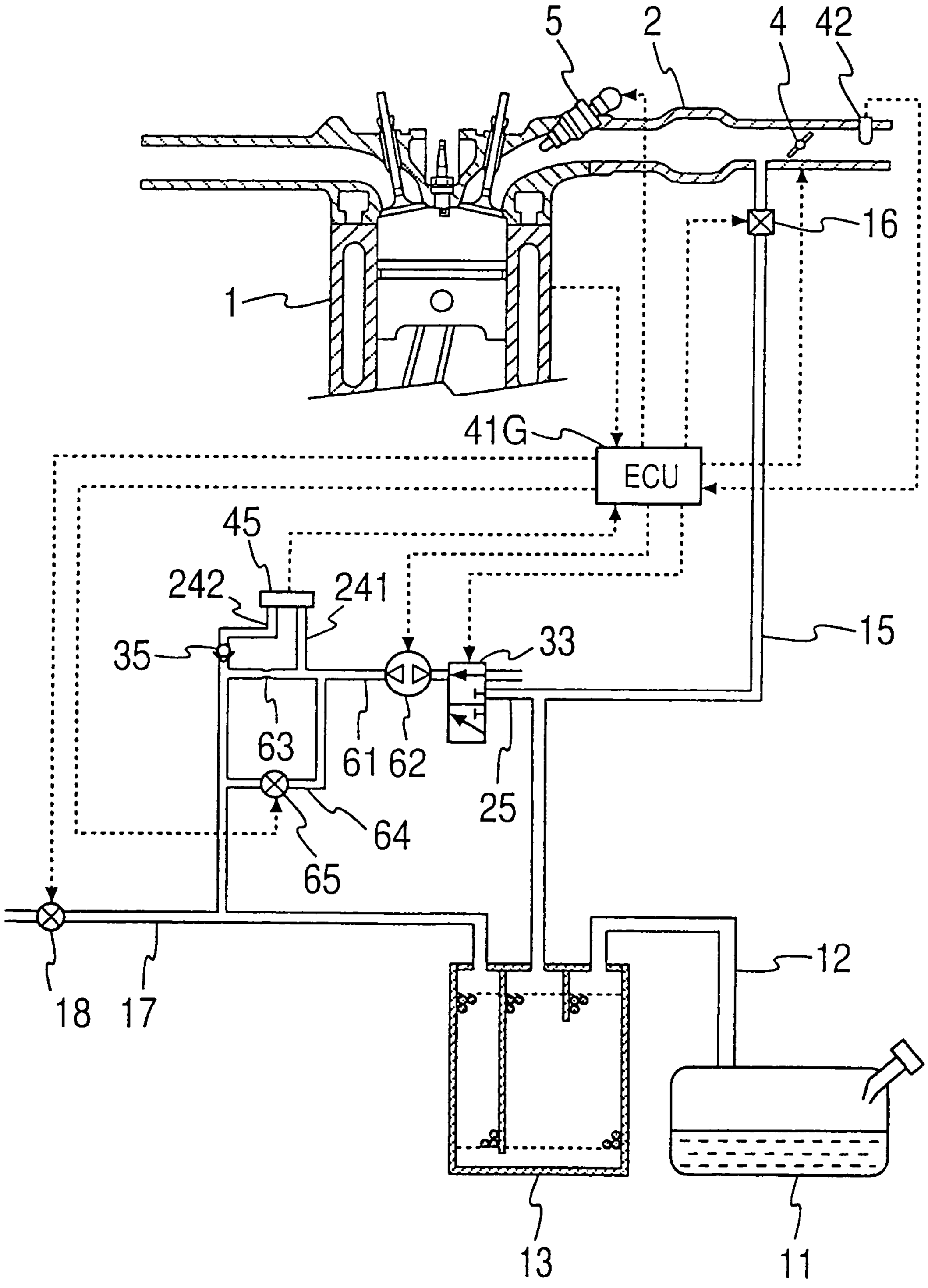
FIG. 38 is a construction diagram of a fuel vapor treatment system for an internal combustion engine according to a seventh embodiment of the present invention.

FIG. 38 shows the construction of an engine according to a seventh embodiment of the present invention. This embodiment corresponds to a replacement of a part of the construction of the fifth embodiment. Portions which perform substantially the same operations as in the previous embodiments are identified by the same reference numerals as in the previous embodiments and a description will be given below mainly about the difference from the previous embodiments.

In this embodiment, a check valve 35 is disposed in the pressure conduit 242 instead of the switching valve for switching the pressure conduit 242 for the differential pressure sensor 45 from one to the other between the fuel vapor passage 61 side and the atmosphere open side. The check valve 35 is mounted in such a manner that the direction from the fuel vapor passage 61 to the differential pressure sensor 45 is a forward direction. The check valve 35 becomes open when the orifice 63 is on the discharge side of the pump 62, and a differential pressure is known from a signal detected by the differential pressure sensor 45. When the orifice 63 is on the suction side of the pump 62 in a leak measurement state, the check valve 35 is closed and the internal pressure of the fuel vapor passage 61 is known from a signal detected the differential pressure signal 45. Thus, by only switching the rotational direction of the pump 62, the output of the differential pressure sensor 45 can be switched between differential pressure and pressure without control by ECU 41G. Consequently, it is possible to not only simplify the construction but also lighten the control burden on ECU 41G.

Eighth Embodiment

Figure 39:
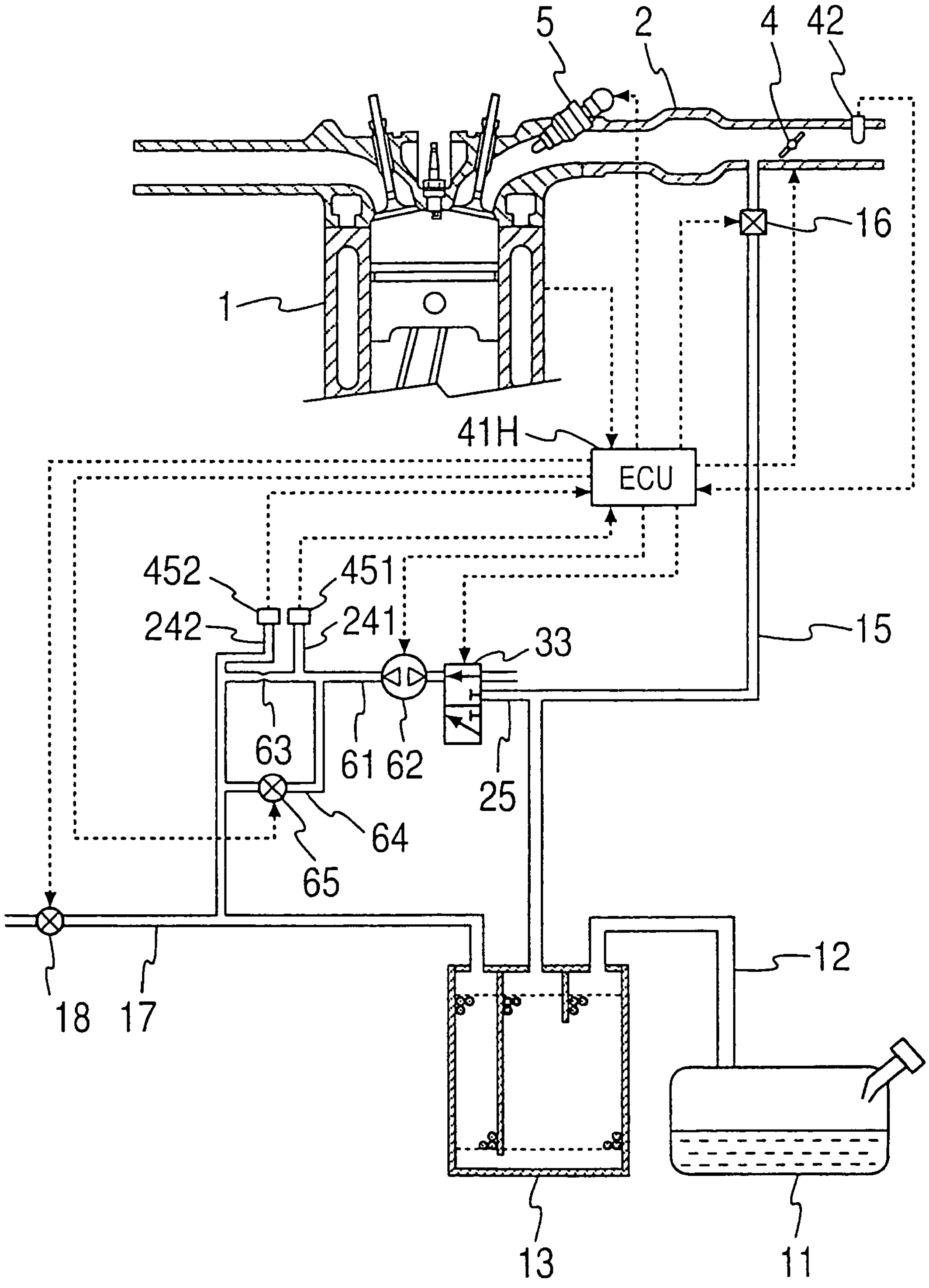
FIG. 39 is a construction diagram of a fuel vapor treatment system for an internal combustion engine according to an eighth embodiment of the present invention.

FIG. 39 shows the construction of an engine according to an eighth embodiment of the present invention. This embodiment corresponds to a replacement of a part of the construction of the fifth embodiment. Portions which perform substantially the same operations as in the previous embodiments are identified by the same reference numerals as in the previous embodiments and a description will be given below mainly about the difference from the previous embodiments.

In this embodiment, like FIGS. 15 and 29, two pressure sensors 451 and 452 are provided in place of the differential pressure sensor 45, and a differential pressure in the orifice 63 necessary for measuring the fuel vapor concentration is obtained by calculating in ECU 41H the difference between pressures detected by the pressure sensors 451 and 452, while the internal pressure of the fuel vapor passage 61 necessary for leak check in the evaporative system is obtained from a signal detected by either the pressure sensor 451 or 452. A further simplification of construction can be attained by making the valve means 34 and 35 in the fifth and seventh embodiments unnecessary.

Figure 40:
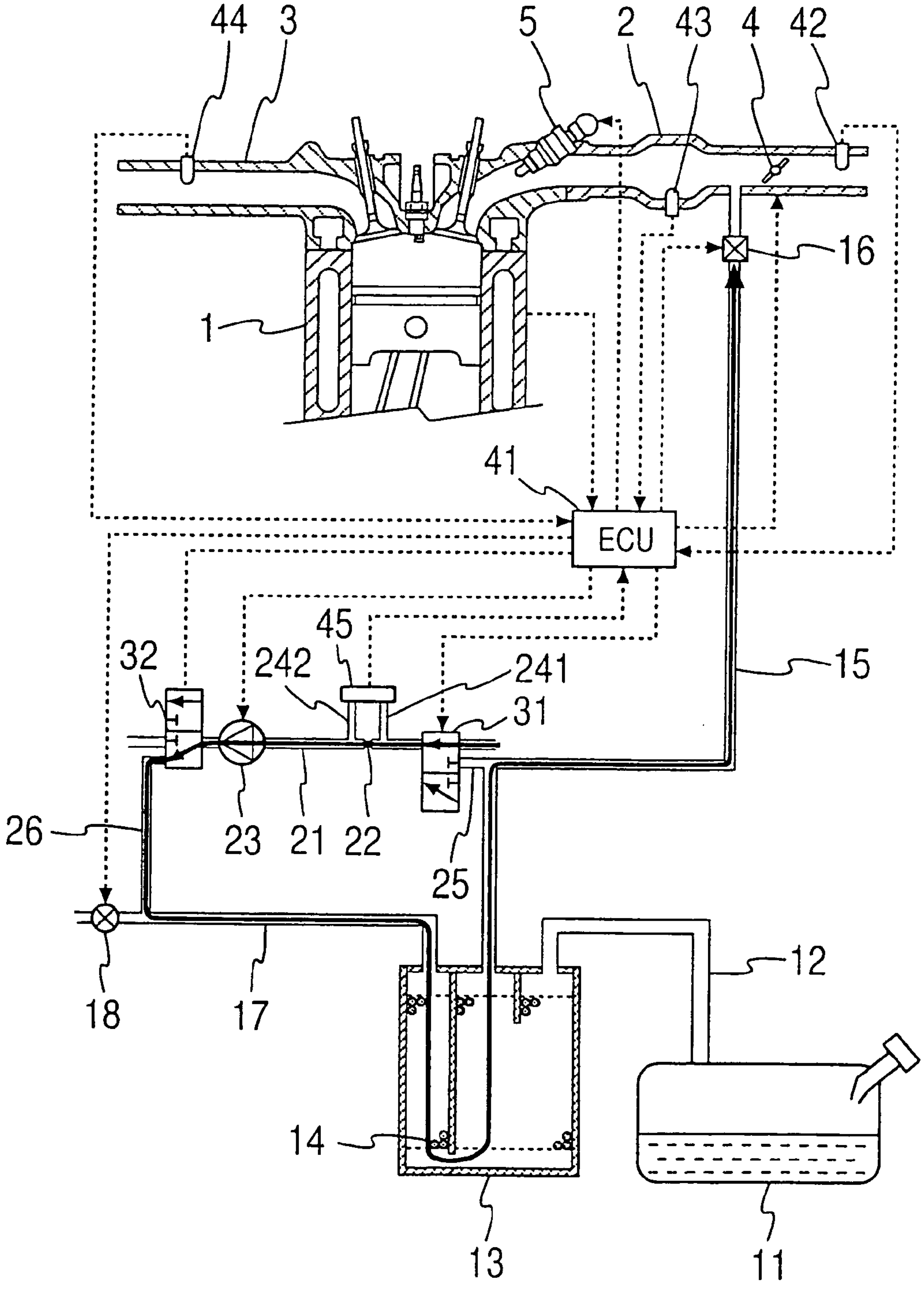
FIG. 40 is a diagram showing the flow of gas during purge according to a modification of the fuel vapor treatment system of the first embodiment.
Figure 41:
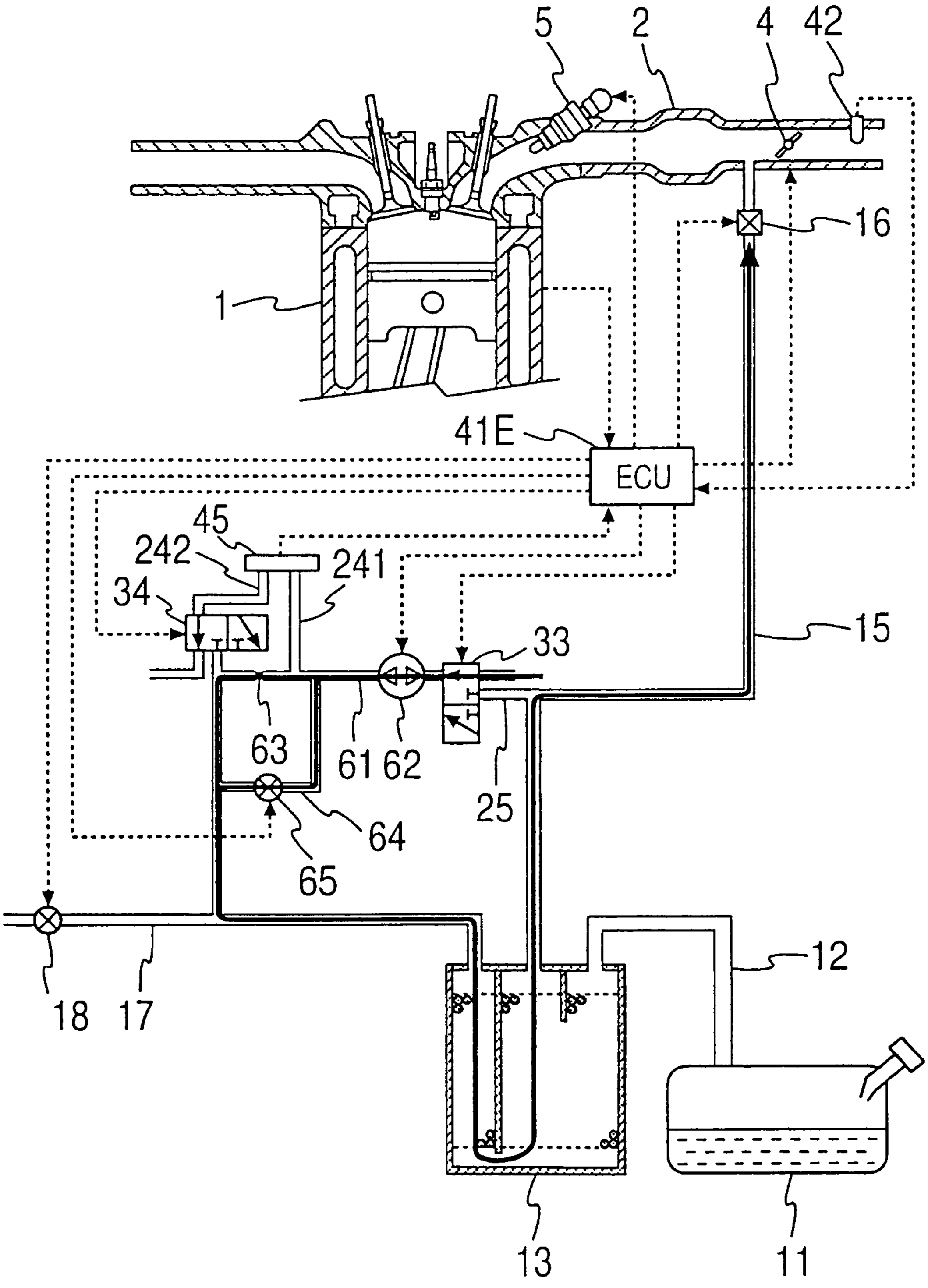
FIG. 41 is a diagram showing the flow of gas during purge according to a modification of the fuel vapor treatment system of the fifth embodiment.

Although in each of the above embodiments the pump is used only for the measurement of fuel vapor concentration and leak check in the evaporative system, the pump may be used in assisting the purge of fuel vapor as follows. During the execution of purge in the constructions of FIGS. 1 and 22, the closing valve 18 is closed, the first switching valve 31 is turned OFF, and the second switching valve 32 is turned ON. When the pump 23 is activated in this state, there is formed such a gas flow path as shown in FIG. 40 (the illustrated construction is of FIG. 1) and it is possible to increase the purge flow rate. In an engine or operation region of a low negative pressure of the intake pipe 2 it is possible to replenish the purge quantity. During the execution of purge in the construction of FIG. 36, the closing valve 18 is closed and the opening/closing valve 65 is opened. The switching valve 33 is on the atmosphere open side. When the pump 23 is operated in this state, there is formed such a gas flow path as shown in FIG. 41, whereby it is possible to increase the purge flow rate. The burden on the pump 62 is small in this example. Also in the constructions of FIGS. 1 and 22, the pump burden can be lightened by providing a passage which bypasses the orifice 22 and also providing a valve for opening and closing the said passage. However, one such additional valve is needed. It can be said that the constructions of the fifth to seventh embodiments using a pump capable of rotating forward and reverse to reduce the number of valves are of extremely high practical value.

Pre-purge of fuel vapor may be performed before the detection of a differential pressure in the first concentration measurement state and the detection of a differential pressure in the second concentration measurement state. By once purging the fuel vapor staying in the canister and in the purging passage it is possible to avoid mixing of fuel vapor into the gas flowing through the fuel vapor passage in the first concentration measurement state wherein the gas flowing through the fuel vapor passage is the air. There may be added a processing wherein in accordance with an ECU control program as pre-purge means the purge valve 18 is opened for a predetermined time prior to execution of the concentration detecting routine (Step S102). In this case, the predetermined time is set so that the purge quantity during that time corresponds to the volume from the front end of the purged air passage up to the closing valve. It is possible to prevent the pre-purge from being continued longer than necessary and make a prompt shift to the concentration detecting routine.

Concrete specifications of the present invention are not limited to those described above, but any other specifications may be adopted insofar as they are not contrary to the gist of the invention.

What is claimed is:

1. A fuel vapor treatment system for an internal combustion engine comprising:

a canister containing an adsorbing material for temporarily adsorbing fuel vapor conducted thereto from the interior of a fuel tank through an inlet passage;

a purging passage for conducting an air-fuel mixture containing fuel vapor desorbed from the adsorbing material into an intake pipe of the internal combustion engine and purging the fuel vapor;

a purge control valve disposed in the purging passage;

a fuel vapor passage for connecting the canister with an atmosphere;

a gas flow producing means provided in the fuel vapor passage for producing a gas flow; and a pressure detecting means provided in the fuel vapor passage for detecting pressure in the fuel vapor passage, wherein a purge flow rate is adjusted based on the pressure in the fuel vapor passage detected by the pressure detecting means in a state where the gas flow is produced by the gas flow producing means.

2. A fuel vapor treatment system for an internal combustion engine as in claim 1 wherein the fuel vapor passage is provided with an orifice between the canister and the pressure detecting means.

3. A fuel vapor treatment system for an internal combustion engine comprising:

a canister containing an adsorbing material for temporarily adsorbing fuel vapor conducted thereto from the interior of a fuel tank through an inlet passage;

a purging passage for conducting an air-fuel mixture containing fuel vapor desorbed from the adsorbing material into an intake pipe of the internal combustion engine and purging the fuel vapor;

a purge control valve disposed in the purging passage;

a measurement passage having an orifice;

a gas flow producing means for producing a gas flow within and along the measurement passage;

a measurement passage switching means for switching the measurement passage between a first measurement state in which the measurement passage is open to the atmosphere at both ends thereof, allowing an air to flow through the measurement passage, and a second measurement state in which the measurement passage is put in communication at least one end thereof with the canister, allowing the air-fuel mixture fed from the canister to flow through the measurement passage; and a pressure detecting means for detecting a pressure depending on the orifice and the gas flow producing means, wherein a purge flow rate is adjusted based on a pressure detected in the first measurement state and a pressure detected in the second measurement state.

4. A fuel vapor treatment system for an internal combustion engine as in claim 3 further comprising:

a fuel vapor condition calculating means for calculating a fuel vapor condition based on a comparing result which is obtained by respectively comparing the pressure detected in the first measurement state and the pressure detected in the second measurement state with a predetermined reference pressure under a constant condition.

5. A fuel vapor treatment system for an internal combustion engine as in claim 4 wherein the fuel vapor condition calculating means pre-stores a linear function for correlating the fuel vapor condition with the ratio between the pressure detected in the first measurement state and the pressure detected in the second measurement state, and calculates the fuel vapor condition in accordance with the linear function.

6. A fuel vapor treatment system for an internal combustion engine as in claim 3 further comprising an allowable-purge-flow-rate-upper-limit-value setting means for setting an allowable upper-limit value of purge flow rate based on operating conditions of the internal combustion engine, and a degree-of-opening setting means for setting the degree of opening of the purge control valve so that an actual purge flow rate does not exceed the allowable upper-limit value.

7. A fuel vapor treatment system for an internal combustion engine as in claim 4 further comprising:

a bypass which connects a purged air passage for the supply of purged air to the canister and the measurement passage with each other to let a portion of purged air be fed from the purged air passage to the purging passage through the bypass while bypassing the canister and further through the measurement passage; and another fuel vapor condition calculating means for calculating a fuel vapor condition based on a pressure detected at the time of purging of the fuel vapor.

8. A fuel vapor treatment system for an internal combustion engine as in claim 4 wherein the measurement of the fuel vapor condition is performed before purging of the fuel vapor.

9. A fuel vapor treatment system for an internal combustion engine as in claim 8 wherein the fuel vapor condition calculating means updates the fuel vapor condition to the latest value with a predetermined cycle, and the degree of opening of the purge control valve is set based on the latest value of the fuel vapor condition.

10. A fuel vapor treatment system for an internal combustion engine as in claim 6 wherein a predetermined upper-limit value is provided for the set degree of opening of the purge control valve before execution of the fuel vapor condition measurement.

11. A fuel vapor treatment system for an internal combustion engine as in claim 3 wherein the measurement passage switching means comprises a first switching valve, the first switching valve being disposed at one end portion of the measurement passage to bring the one end portion into communication with either a port located on the purging passage side or a port located on the atmosphere side, and a second switching valve, the second switching valve being disposed at an opposite end portion of the measurement passage to bring the opposite end portion into communication with either a port located on the canister side or a port located on the atmosphere side, and an atmosphere inlet passage is provided, the atmosphere inlet passage branching from a purged air passage which is for the supply of purged air as a constituent of the air-fuel mixture to the canister and coming into communication with both the atmosphere-side port of the first switching valve and the atmosphere-side port of the second switching valve.

12. A fuel vapor treatment system for an internal combustion engine as in claim 11 further comprising a pre-purge means for performing pre-purge of fuel vapor prior to detection of a pressure in the first measurement state and detection of a pressure in the second measurement state.

13. A fuel vapor treatment system for an internal combustion engine as in claim 12 wherein the purge quantity in the pre-purge is a quantity corresponding to the volume from a front end of the purged air passage which is open to the atmosphere up to a closing valve which is disposed in the purged air passage to shut off the canister from the atmosphere side.

14. A fuel vapor treatment system for an internal combustion engine as in claim 3 wherein the gas flow producing means is an electric pump, of which rotation speed is controlled to a constant value.

15. A fuel vapor treatment system for an internal combustion engine as in claim 14 wherein the rotation speed of the electric pump is set so that the pressure detected in the first measurement state falls within a predetermined range.

16. A fuel vapor treatment system as in claim 3 wherein the gas flow producing means is an electric pump, and the pressure detecting means is constituted by a pump-operation-state detecting means for detecting a state of operation of the electric pump which state varies depending on the load on the electric pump.

17. A fuel vapor treatment system for an internal combustion engine as in claim 3 wherein a closed space including the canister and formed upon closing of the purge control valve is used as a space for checking gas leak, and which further comprises:

a leak check passage which is open to an atmosphere at one end thereof and which is provided with a reference orifice;

a pressure applying means for applying or reducing pressure in the closed space and in the interior of the leak check passage;

a pressure detecting means for detecting the pressure in the closed space or in the leak check passage after pressurized or pressure-reduced by the pressure applying means;

a pressure application range switching means, the pressure application range switching means selecting at least one pressure application range pressurized or pressure-reduced by the pressure applying means from the closed space and the interior of the leak check passage and making switching from one to the other between two leak measurement states different from each other in the pressure application range; and a leak hole determining means for determining the size of a leak hole in the closed space based on a detected pressure in the first leak measurement state and a detected pressure in the second leak measurement state, the pressure applying means being constituted by the gas flow producing means.

18. A fuel vapor treatment system as in claim 17 wherein the pressure applying means is for pressurizing the closed space and the interior of the leak check passage, and an opening/closing valve for opening and closing a passage is disposed in the passage which passage is used for the pressure applying means to pressurize the closed space.

19. A fuel vapor treatment system for an internal combustion engine as in claim 17 wherein the leak check passage is constituted by a condition measurement passage, the reference orifice is constituted by the orifice, the pressure application range switching means is constituted by the measurement passage switching means, the pressure detecting means is constituted by the pressure detecting means;

the gas flow producing means as the pressure applying means is constituted by an electric pump disposed in the condition measurement passage and capable of being switched its rotational direction between forward rotation and reverse rotation;

as the measurement passage switching means, in the condition measurement passage, a switching valve is disposed which, in the first measurement state, causes the condition measurement passage to be open to the atmosphere at one end thereof and shuts off the purging passage from the condition measurement passage and which, in the second measurement state, makes the condition measurement passage communicate with the purging passage; and in the first leak measurement state, the leak check passage is selected as the pressure application range, while in the second leak measurement state, the closed space is selected as the pressure application range, the switching valve is set to a state equal to that in the first measurement state, and the rotational direction of the electric pump is made reverse to that in the second measurement state.

20. A fuel vapor treatment system for an internal combustion engine as in claim 17 wherein the gas flow producing means is an electric pump, the number of revolutions of the electric pump being controlled to a constant value so as to be large during measurement of the fuel vapor condition and small during gas leak check.

21. A fuel vapor treatment system for an internal combustion engine as in claim 3 wherein a closed space including the canister and formed upon closing of the purge control valve is used as a space for checking gas leak, and further comprises:

a leak check passage which is open to the atmosphere at one end thereof and which is provided with a reference orifice;

a pressure applying means for applying or reducing pressure for the closed space and for the interior of the leak check passage;

a pressure detecting means for detecting the pressure in the closed space or in the leak check passage after pressurized or pressure-reduced by the pressure applying means;

a pressure application range switching means, the pressure application range switching means selecting at least one pressure application range pressurized or pressure-reduced by the pressure applying means from the closed space and the interior of the leak check passage and making switching from one to the other between two leak measurement states different from each other in the pressure application range and a leak hole determining means for determining the size of a leak hole in the closed space based on a detected pressure in the first leak measurement state and a detected pressure in the second leak measurement state;

the pressure detecting means being constituted by the pressure detecting means.

22. A fuel vapor treatment system for an internal combustion engine as in claim 3 wherein the measurement passage, during purge of fuel vapor, is opened to the atmosphere at one end thereof and communicates with the canister at an opposite end thereof, and the gas flow producing means operates during purge of fuel vapor so that purged air is supplied from the condition measurement passage.

23. A fuel vapor treatment system for an internal combustion engine as in claim 3 wherein the pressure depending on the orifice and the gas flow producing means is detected between the orifice and the gas flow producing means.

24. A fuel vapor treatment system for an internal combustion engine as in claim 23 wherein the fuel vapor condition calculating means calculates the fuel vapor condition based on a comparing result which is obtained by comparing the pressure detected in the first measurement state and the pressure detected in the second measurement state with a predetermined reference pressure under an constant condition.

25. A fuel vapor treatment system for an internal combustion engine as in claim 24 wherein the predetermined reference pressure is a pressure before the gas flow producing means is activated.

26. A fuel vapor treatment system for an internal combustion engine as in claim 3 wherein the pressure detecting means is a relative pressure sensor which detects a relative pressure relative to an atmosphere.

27. A fuel vapor treatment system for an internal combustion engine as in claim 3 wherein the pressure detecting means is an absolute pressure sensor detecting an absolute pressure.

28. A fuel vapor treatment system for an internal combustion engine as in claim 3 wherein the pressure depending on the orifice and the gas flow producing means is a differential pressure between both ends of the orifice.

29. A fuel vapor treatment system for an internal combustion engine as in claim 3 wherein the pressure detecting means is a differential pressure detecting means for detecting a differential pressure between both ends of the orifice.

30. A fuel vapor treatment system for an internal combustion engine as in claim 4 wherein the fuel vapor condition is a fuel vapor concentration.

* * * * *